(12) United States Patent
Heo et al.

(10) Patent No.: US 12,038,784 B2
(45) Date of Patent: Jul. 16, 2024

(54) FLEXIBLE DISPLAY AND ELECTRONIC DEVICE COMPRISING SAME

(71) Applicant: Samsung Electronics Co., Ltd., Gyeonggi-do (KR)

(72) Inventors: Changryong Heo, Gyeonggi-do (KR); Valeriy Prushinskiy, Gyeonggi-do (KR); Mijeong Song, Gyeonggi-do (KR); Minuk Kim, Gyeonggi-do (KR); Hajoong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 17/257,075

(22) PCT Filed: Jul. 5, 2019

(86) PCT No.: PCT/KR2019/008263
§ 371 (c)(1),
(2) Date: Dec. 30, 2020

(87) PCT Pub. No.: WO2020/013528
PCT Pub. Date: Jan. 16, 2020

(65) Prior Publication Data
US 2021/0116959 A1      Apr. 22, 2021

(30) Foreign Application Priority Data

Jul. 13, 2018   (KR) ........................ 10-2018-0081708

(51) Int. Cl.
*G01B 7/28*      (2006.01)
*G06F 1/16*      (2006.01)
*H05K 5/00*      (2006.01)

(52) U.S. Cl.
CPC ............. *G06F 1/1601* (2013.01); *G01B 7/28* (2013.01); *G06F 1/163* (2013.01); *G06F 1/1647* (2013.01); *G06F 1/1652* (2013.01); *H05K 5/0017* (2013.01)

(58) Field of Classification Search
CPC ........... G01B 7/24; G01B 7/28; G06F 1/1601; G06F 1/1607; G06F 1/163; G06F 1/1643;
(Continued)

(56) References Cited

U.S. PATENT DOCUMENTS

2008/0086925 A1    4/2008  Yang
2012/0242588 A1*   9/2012  Myers ................. H04M 1/0269
                                                          345/173

(Continued)

FOREIGN PATENT DOCUMENTS

KR    10-2013-0126710 A    11/2013
KR    10-2014-0133034 A    11/2014
(Continued)

OTHER PUBLICATIONS

Korean Office Action dated Nov. 28, 2022.
Decision on Grant dated Feb. 14, 2023.

*Primary Examiner* — Alexander Satanovsky
*Assistant Examiner* — Brent J Andrews
(74) *Attorney, Agent, or Firm* — Cha & Reiter, LLC

(57) ABSTRACT

An electronic device according to various embodiments of the present disclosure may comprise: a housing comprising a front plate facing in a first direction, a rear plate facing in a second direction opposite to the first direction, and a side member disposed to surround a space between the front plate and the rear plate; a rigid display disposed between the front plate and the rear plate of the housing, for externally displaying information in the first direction; a flexible display extending from one side of the rigid display and bending relative to the rigid display, thereby forming a
(Continued)

curved surface, or disposed in parallel to the rigid display, thereby forming a flat surface; a plurality of magnets arranged at a specified interval in the flexible display; and a first sensor disposed in the rigid display and configured to sense the degree of bending of the flexible display by sensing magnetic forces provided by the plurality of magnets.

13 Claims, 18 Drawing Sheets

(58) Field of Classification Search
CPC .... G06F 1/1647; G06F 1/1652; G06F 1/1677; G06F 1/3206; G06F 1/3215; G06F 1/3265; G06F 1/3287; G06F 2200/1632; G06F 2200/1637; G06F 3/0482; G06F 3/0485; H05K 5/0017; Y02D 10/00; Y02D 30/00
See application file for complete search history.

(56) References Cited

U.S. PATENT DOCUMENTS

| | | |
|---|---|---|
| 2014/0015743 A1 | 1/2014 | Seo et al. |
| 2014/0333545 A1 | 11/2014 | Lee et al. |
| 2015/0268914 A1 | 9/2015 | Kim et al. |
| 2015/0338888 A1* | 11/2015 | Kim ...................... G06F 1/1643 345/156 |
| 2016/0195902 A1 | 7/2016 | Huh et al. |
| 2016/0231785 A1 | 8/2016 | Vartanian |
| 2017/0060183 A1 | 3/2017 | Zhang et al. |
| 2017/0212607 A1* | 7/2017 | Yoon ...................... G06F 3/147 |
| 2017/0287436 A1 | 10/2017 | Korzunov |

FOREIGN PATENT DOCUMENTS

| | | |
|---|---|---|
| KR | 10-2016-0032079 A | 3/2016 |
| KR | 10-2016-0138939 A | 12/2016 |
| KR | 10-2017-0032172 A | 3/2017 |
| KR | 10-2017-0089664 A | 8/2017 |
| KR | 10-1769941 B1 | 8/2017 |
| WO | 2006/085271 A2 | 8/2006 |

* cited by examiner

FLEXIBLE DISPLAY AND ELECTRONIC DEVICE COMPRISING SAME

This application is a National Phase Entry of PCT international Application No. PCT/KR2019/008263, which was filed on Jul. 5, 2019, and claims priority to Korean Patent Application No. 10-2018-0081708, which was filed on Jul. 13, 2018, in the Korean Intellectual Property Office, the contents of which are incorporated herein by reference.

TECHNICAL FIELD

Various embodiments of the disclosure relate to a flexible display and an electronic device including the same.

BACKGROUND ART

An electronic device means to a device that performs a specific function according to a program equipped therein, such as an electronic scheduler, a portable multimedia reproducer, a mobile communication terminal, a tablet PC, an image/sound device, a desktop/laptop PC, or a vehicular navigation system, as well as a home appliance. For example, such an electronic device may output information stored therein as sound or an image. As the integration degree of electronic devices has increased and super-high speed and large-capacity wireless communication have become popular, various functions have recently been provided in a single electronic device. For example, various functions, such as an entertainment function (e.g., a game function), a multimedia function (e.g., a music/video reproducing function), a communication and security function for mobile banking, a schedule management function, and an e-wallet function, in addition to a communication function, have come to be integrated in a single electronic device.

A display mounted on an electronic device may provide various kinds of visual information to a user by outputting a content such as text or an image. As entertainment functions and multimedia functions of electronic devices have been and are being greatly developed, users may prefer high-definition and large-screen displays. In this current situation, a flexible display requires a small carrying or accommodation space, but can be used in the state in which the screen display area thereof is expanded on the electronic device, if necessary. For example, a flexible display is capable of being carried or accommodated in a foldable, bendable, or rollable state so that convenience can be provided to a user, and in an unfolded state, the flexible display provides an expanded screen so that a multimedia function can be conveniently used.

DETAILED DESCRIPTION OF THE INVENTION

Technical Problem

It is possible to bend or roll a flexible display with a certain degree of curvature. However, when the flexible display is unfolded from a body housing, the flexible display may provide a relatively low flatness compared to a conventional display using glass as a panel substrate.

As another example, when a flexible display is rolled and accommodated in a housing, the flexible display may be rolled back, and a distortion phenomenon may occur due to restoring force generated thereby.

As another example, a member, which can be engaged with a support member for supporting a flexible display using a magnet, may be mounted on an edge portion of the flexible display in order to protect the edge of the flexible display and to secure the flatness of the flexible display in the state in which the flexible display is unfolded. In this case, an overall system size may be increased, and a system complexity and cost may be increased.

According to various embodiments of the disclosure, it is possible to provide an electronic device that can be smoothly bent, rolled, or folded while preventing damage to a flexible display, which may be caused due to shape deformation.

According to various embodiments of the disclosure, it is possible to provide an electronic device in which a flexible display is capable of having an improved flatness in an unfolded state without a holder that increases a system complexity and cost.

Technical Solution

An electronic device according to various embodiments of the disclosure may include: a housing including a front plate oriented in a first direction, a rear plate oriented in a second direction opposite to the first direction, and a side member disposed to surround a space between the front plate and the rear plate; a rigid display disposed between the front plate and the rear plate of the housing, the rigid display being configured to display information to an outside in the first direction; a flexible display extending from one side of the rigid display, the flexible display being bent relative to the rigid display so as to define a curved surface or being disposed parallel to the rigid display so as to define a flat surface; a plurality of magnets arranged at a predetermined interval inside the flexible display; and a first sensor disposed inside the rigid display, the first sensor being configured to detect a degree of bending and/or rolling of the flexible display by detecting magnetic force provided by the plurality of magnets.

An electronic device according to various embodiments of the disclosure may include: a housing including a front plate, a rear plate facing away from the front plate, and a side member disposed to surround a space between the front plate and the rear plate; a rigid display disposed inside the housing and configured to display information to an outside; a flexible display disposed outside the housing and extending from one side of the rigid display, the flexible display being bendable. The flexible display is configured to be variable to: a first state in which one surface of the flexible display is disposed to be oriented in the same direction as the rigid display; a second state in which the one surface of the flexible display is disposed to surround at least part of the front plate, the rear plate, and the side member; and a third state in which the flexible display is rolled and is disposed on one side of the housing.

Advantageous Effects

With an electronic device according to various embodiments of the disclosure, since a rigid display and a flexible display are integratedly disposed, it is possible to provide a display area having a large area.

An electronic device according to various embodiments of the disclosure can be smoothly bent, rolled, or folded while preventing damage to a flexible display, which may be caused due to shape deformation.

With an electronic device according to various embodiments of the disclosure, since a flexible display is capable of covering a portion of a rigid display in a bent or rolled state and a separate device for accommodating the flexible display is not necessary, it is possible to solve the problem of increasing system complexity and costs.

With an electronic device according to various embodiments of the disclosure, it is possible to provide an improved flatness of a flexible display in an unfolded state.

MODE FOR CARRYING OUT THE INVENTION

Figure 1:
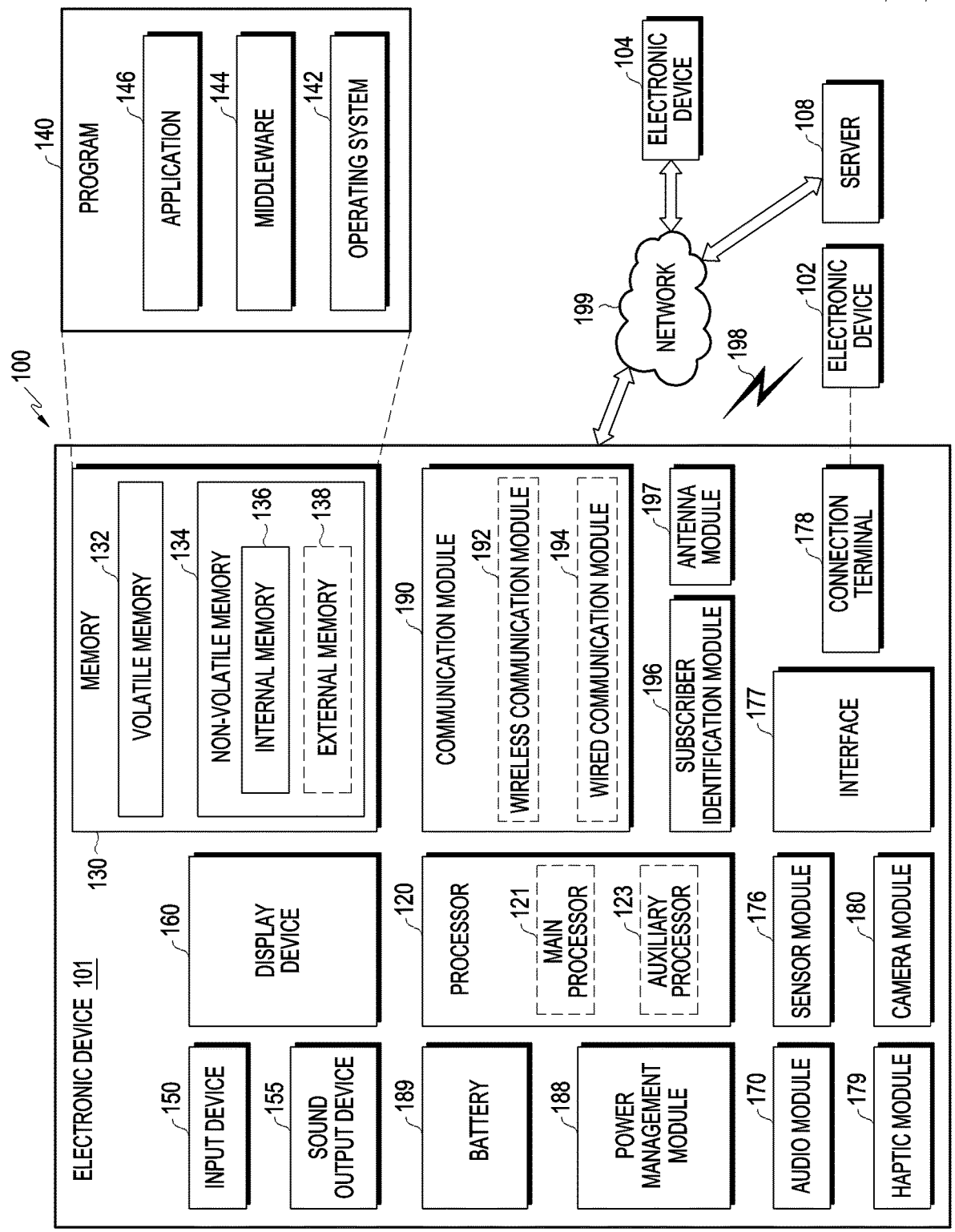
FIG. 1 is a block diagram illustrating an electronic device 101 according to various embodiments in a network environment 100.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
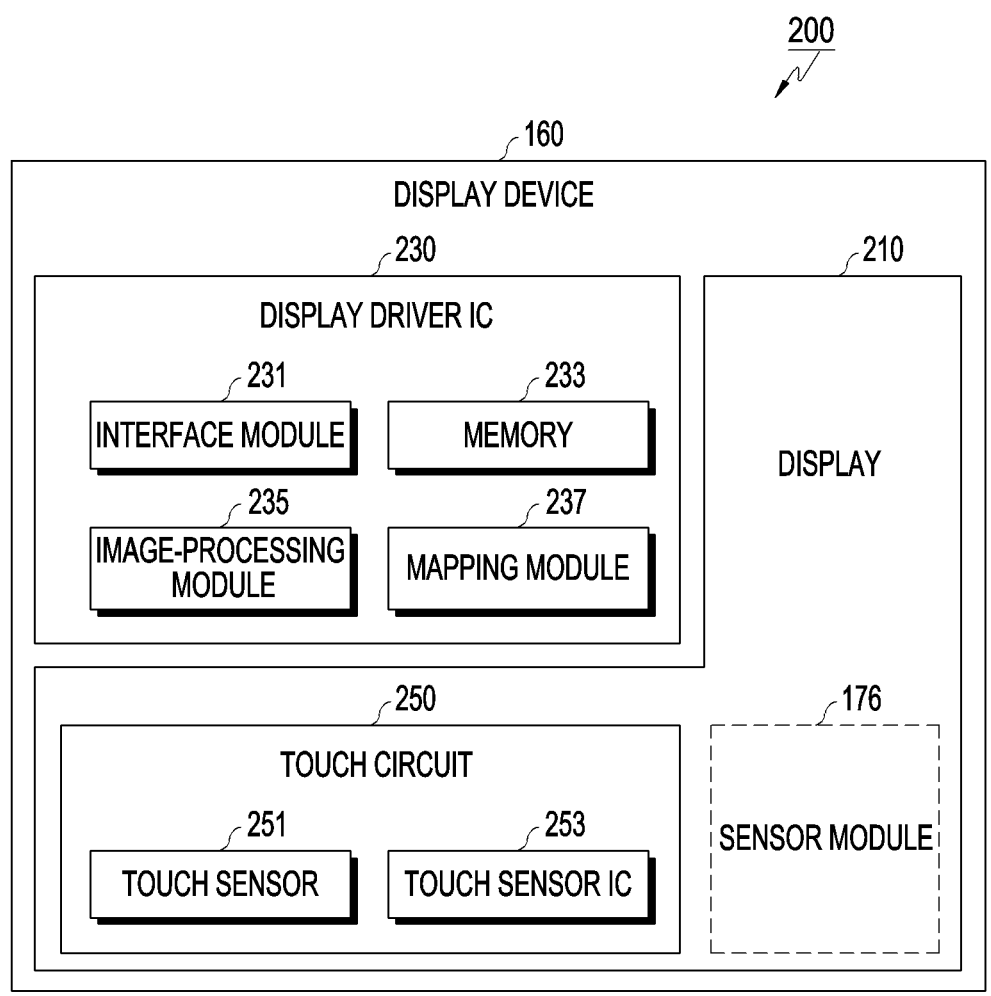
FIG. 2 is a block diagram 200 of a display device 160 according to various embodiments of the disclosure.

FIG. 2 is a block diagram 200 of a display device 160 according to various embodiments of the disclosure.

Referring to FIG. 2, the display device 160 may include a display 210 and a Display Driver IC (DDI) 230 configured to control the display 210. The DDI 230 may include an interface module 231, a memory 233 (e.g., a buffer memory), an image processing module 235, or a mapping module 237. The DDI 230 may receive, for example, image data, or image information including a video control signal corresponding to a command for controlling the image data, from other components of the electronic device 101 via the interface module 231. For example, according to an embodiment, the image information may be received from a processor 120 (e.g., a main processor (e.g., the main processor 121 in FIG. 1)) (e.g., an application processor), or an auxiliary processor 123 (e.g., the auxiliary processor 123 in FIG. 1) (e.g., a graphic processing device) operated independently from the function of the main processor 121. The DDI 230 may communicate with the touch circuit 250, the sensor module 176, or the like through the interface module 231. In addition, the DDI 230 may store at least a part of the received image information in the memory 233, for example, on a frame-by-frame basis. The image processing module 235 may perform pre-processing or post-processing (e.g., resolution, brightness, or size adjustment) on at least a part of the image data based at least on the characteristics of the image data or characteristics of the display 210. The mapping module 237 may generate a voltage value or a current value corresponding to the image data pre-processed or post-processed through the image processing module 135. According to an embodiment, the generation of the voltage value or the current value may be performed based at least on, for example, the attributes of the pixels of the display 210 (e.g., the array of pixels (an RGB stripe or pentile structure) or the size of each of sub-pixels. At least some of the pixels of the display 210 are driven based at least on a part, for example, of the voltage value or the current value, so that visual information (e.g., texts, images, or icons) corresponding to the video data can be displayed through the display 210.

According to an embodiment, the display device 160 may further include a touch circuit 250. The touch circuit 250 may include a touch sensor 251 and a touch sensor IC 253 configured to control the touch sensor 251. The touch sensor IC 253 may control the touch sensor 251 to detect, for example, a touch input or a hovering input with respect to a specific position in the display 210. For example, the touch sensor IC 253 may detect a touch input or a hovering input by measuring a change in a signal (e.g., voltage, light amount, resistance, or charge amount) with respect to a specific position in the display 210. The touch sensor IC 253 may provide the processor 120 with information about the sensed touch input or hovering input (e.g., position, area, pressure, or time). According to an embodiment, at least a part of the touch circuit 250 (e.g., the touch sensor IC 253) may be included as a part of the display driver IC 230 or the display 210 or a part of another component (e.g., an auxiliary processor 123) disposed outside the display device 160.

According to an embodiment, the display device 160 may further include at least one sensor (e.g., a fingerprint sensor, an iris sensor, a pressure sensor, or an illuminance sensor) of a sensor module 176, or a control circuit therefor. In this case, the at least one sensor or control circuitry may be embedded in a portion of the display device 160 (e.g., the display 210 or the DDI 230) or a portion of touch circuit 250. For example, when the sensor module 176 embedded in the display device 160 includes a biometric sensor (e.g., a fingerprint sensor), the biometric sensor may acquire biometric information (e.g., a fingerprint image) associated with a touch input through a partial area of the display 210. As another example, when the sensor module 176 embedded in the display device 160 includes a pressure sensor, the pressure sensor acquires pressure information associated with a touch input through all or a part of the area of the display 210. According to an embodiment, the touch sensor 251 or the sensor module 176 may be disposed between pixels of the pixel layer of the display 210, or above or below the pixel layer.

Figure 3:
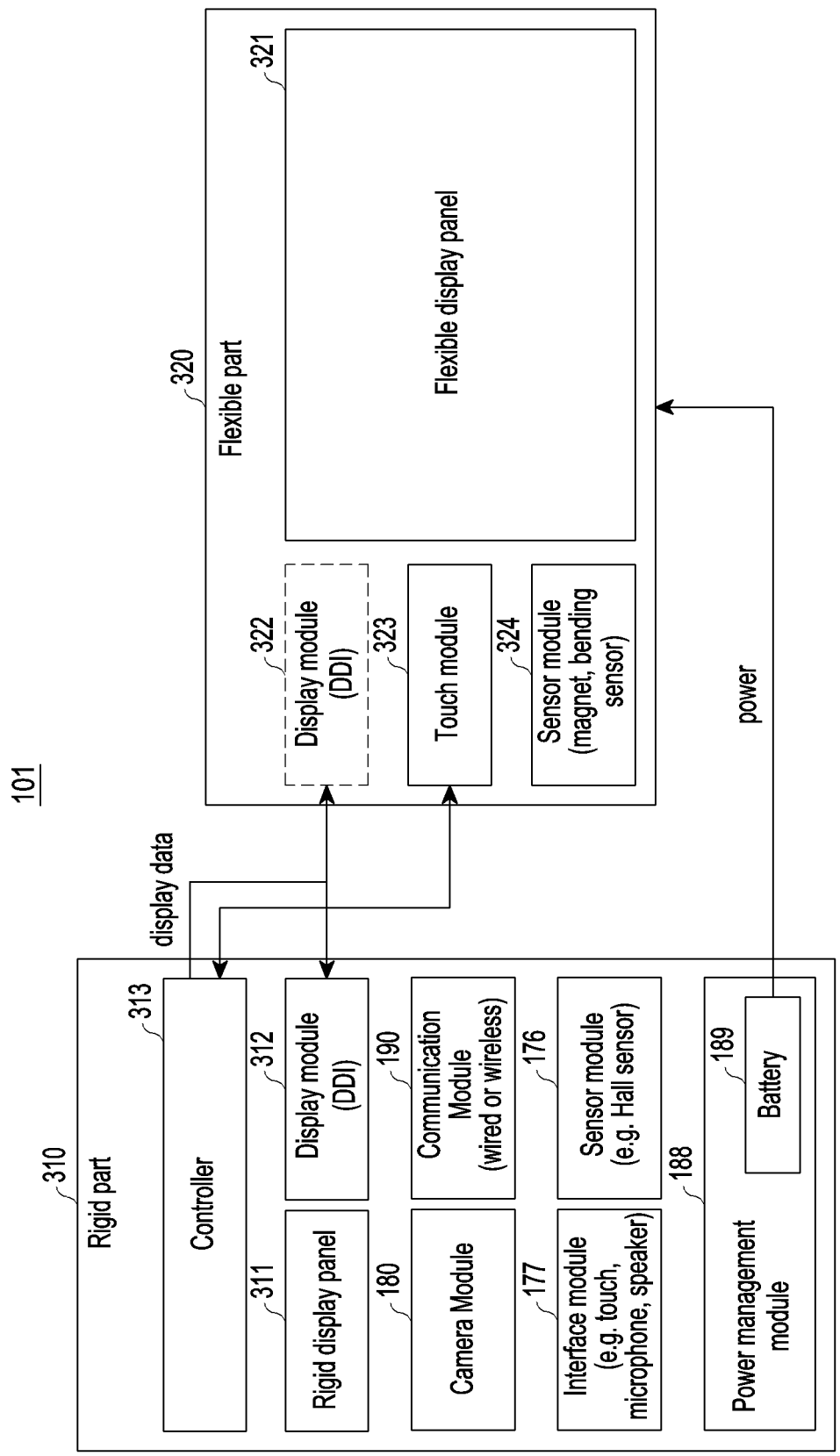
FIG. 3 is a block diagram of an electronic device 101 according to various embodiments of the disclosure, in which a rigid part 310 and a flexible part 320 are illustrated.

FIG. 3 is a block diagram of an electronic device 101 according to various embodiments of the disclosure, in which a rigid part 310 and a flexible part 320 are illustrated.

Referring to FIG. 3, an electronic device 101 may include a rigid part 310 and a flexible part 320, which include separately disposed display panels, respectively. The rigid part 310 may include a controller 313, a rigid display panel 311, a display module 312, a camera module 180, a communication module 190, an interface module 177 (e.g., the interface module 231 in FIG. 2), a sensor module 176, and a power management module 188. The flexible part 320 may include a flexible display panel 321, a display module 322, a touch module 323 (e.g., the touch circuit 250 in FIG. 2), and a sensor module 324 (e.g., the sensor module 176 in FIG. 2).

According to various embodiments, the rigid part 310 is capable of visually providing information to the outside through the rigid display panel 311, and may include the controller 313 configured to control the rigid display panel 311. For example, the controller 313 may cooperate with the display module 312 disposed in the rigid part 310 to receive and process image data or image information including an image control signal corresponding to a command for controlling the image data such that visual information (e.g., text, an image, or an icon) can be displayed through the rigid display panel 311. In addition to the rigid display panel 311, the controller 313 may cooperate with the display module 312 of the flexible part 320 to transmit/receive data necessary for visual information through the flexible display panel 321.

According to various embodiments, the descriptions of the camera module 180, the communication module 190, the interface 177, the sensor module 176, and the power management module 188 of FIG. 1 are applicable mutatis mutandis to the camera module 180, the communication module 190, the interface module 177, the sensor module 176, and the power management module 188 of the rigid part 310. According to an embodiment, in addition to supplying power to at least one component of the rigid unit 310, the battery 189 may supply power to at least one component of the flexible part 320.

According to various embodiments, the flexible part 320 is capable of visually providing information to the outside through the flexible display panel 321, and may be electrically connected to the controller 313 disposed on the rigid part 310 in order to control the flexible display panel 321. For example, the controller 313 may cooperate with the display module 312 disposed in the flexible part 320 to receive and process image data or image information including an image control signal corresponding to a command for controlling the image data such that visual information (e.g., text, an image, or an icon) can be displayed through the flexible display panel 321.

According to an embodiment, the controller 313 may control the touch module 322 and/or the sensor module 176 disposed in the flexible part 320. For example, the controller 313 may control the touch module 322 in order to detect touch input or hovering input on specific positions of the flexible display panel 321 and/or the rigid display panel 311. The flexible part 320 may include a sensor module 176 including, for example, a magnet and a bending sensor for detecting shape deformation of the flexible part 320. The controller 313 may detect the deformation of the flexible unit 320, input of the sensor module 176, for example, the magnet and/or the bending sensor, and may transmit or control display data corresponding to the detected signal.

Figure 4:
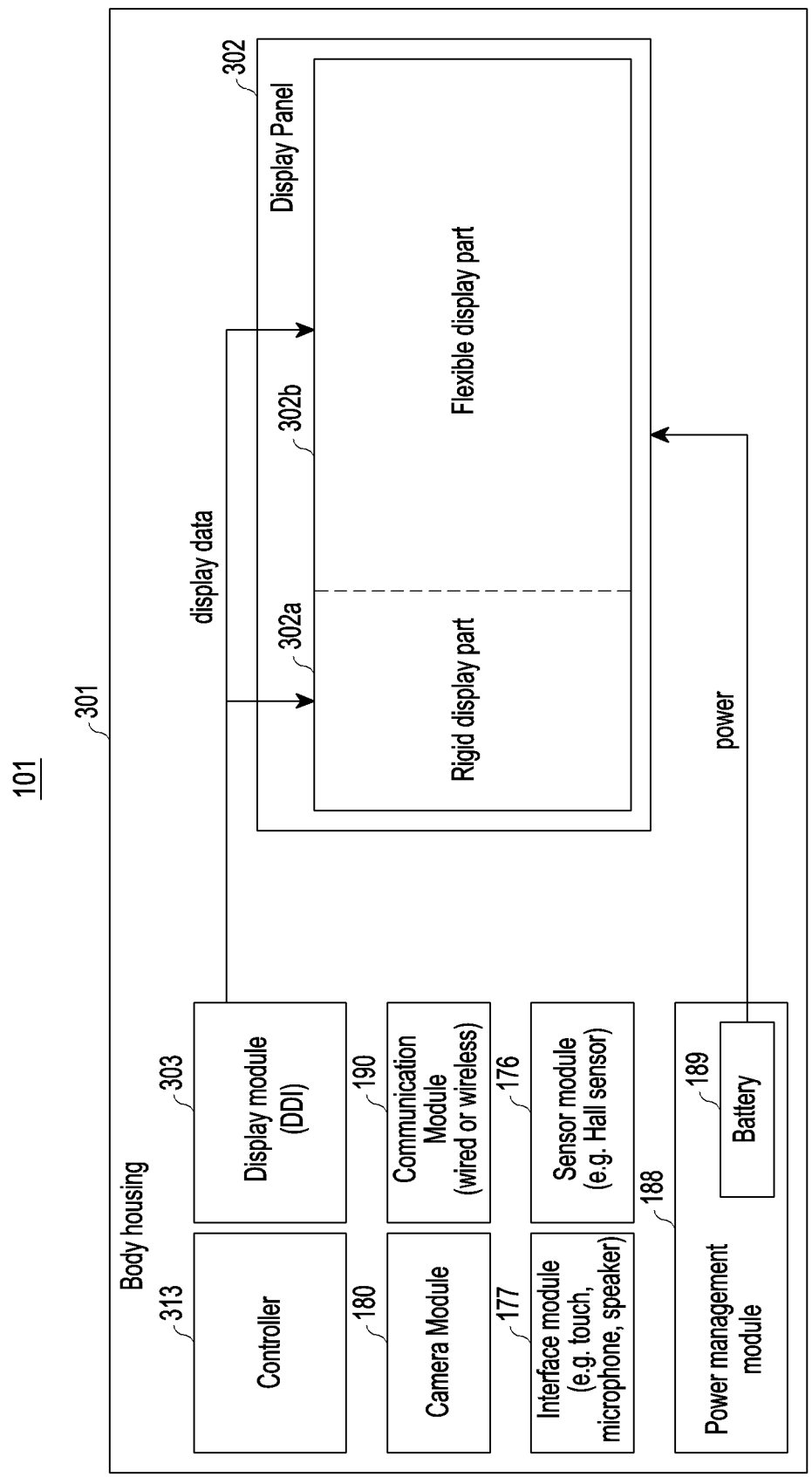
FIG. 4 is a block diagram of a rigid display part 302a and a flexible display part 302b disposed in a single display panel in an electronic device 101 according to various embodiments of the disclosure.

FIG. 4 is a block diagram of a rigid display part 302a and a flexible display part 302b disposed in a single display panel 302 in an electronic device 101 according to various embodiments of the disclosure.

Referring to FIG. 4, the electronic device 101 may include a body housing 301, a controller 313, a display module 303, a camera module 180, a communication module 190, an interface module 177 (e.g., the interface module 231 in FIG. 2), a sensor module 176, a power management module 188, and a display panel 302. The display panel 302 may include a rigid display part 302a and a flexible display part 302b disposed adjacent to the rigid display part 302a.

According to various embodiments, in the electronic device 101, one display panel 302 is divided into the rigid display part 302a and the flexible display part 302b, and an area of the housing 301 corresponding to the flexible display part 302b may include a flexible material (e.g., a polymer material).

According to various embodiments, the rigid part 310 and the flexible display part 302b may be provided as one screen or a divided screen through one display panel 302, and may provide visual information to the outside.

According to various embodiments, the descriptions of the camera module 180, the communication module 190, the interface 177, the sensor module 176, and the power management module 188 of FIG. 1 are applied mutatis mutandis to the camera module 180, the communication module 190, the interface module 177, the sensor module 176, and the power management module 188 of the electronic device 101. As another example, the description of the controller 313, the display module 230, 312, or 322, and the display panel 311 or 321 of FIGS. 2 and 3 is applicable mutatis mutandis to the controller 313, the display module 303, and the display panel 302 of the electronic device 101.

Figure 5:
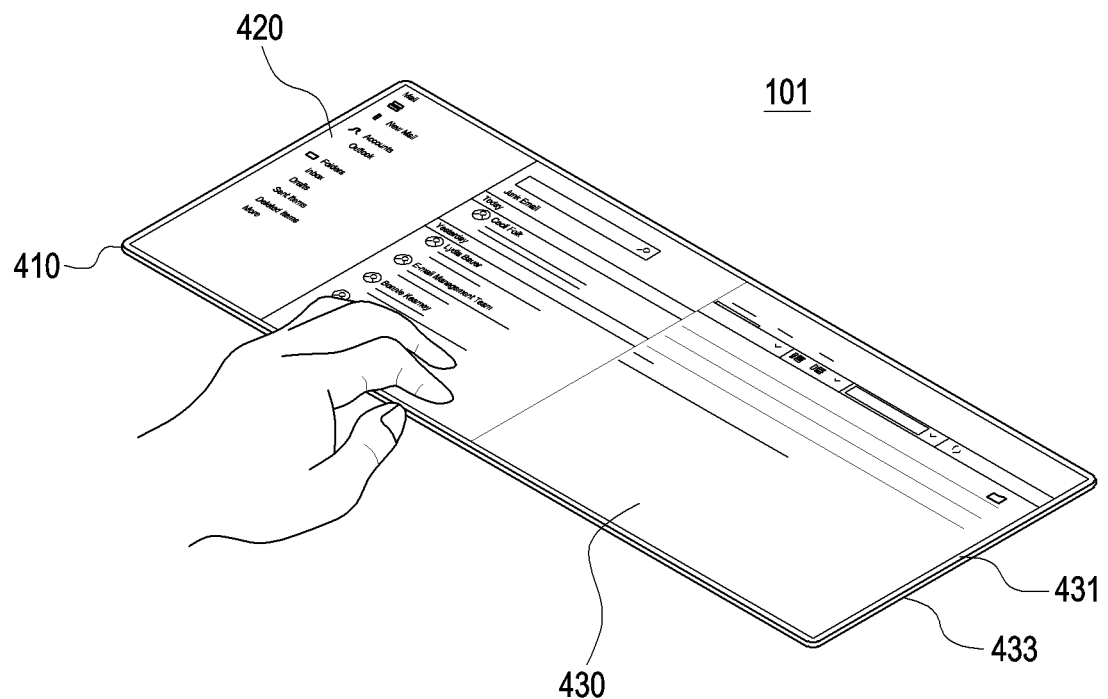
FIG. 5 is a front side perspective view of an electronic device 101 according to various embodiments of the disclosure, in which a flexible display 430 is illustrated in an unfolded state.
Figure 5:
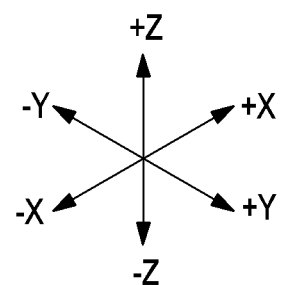
Figure 6:
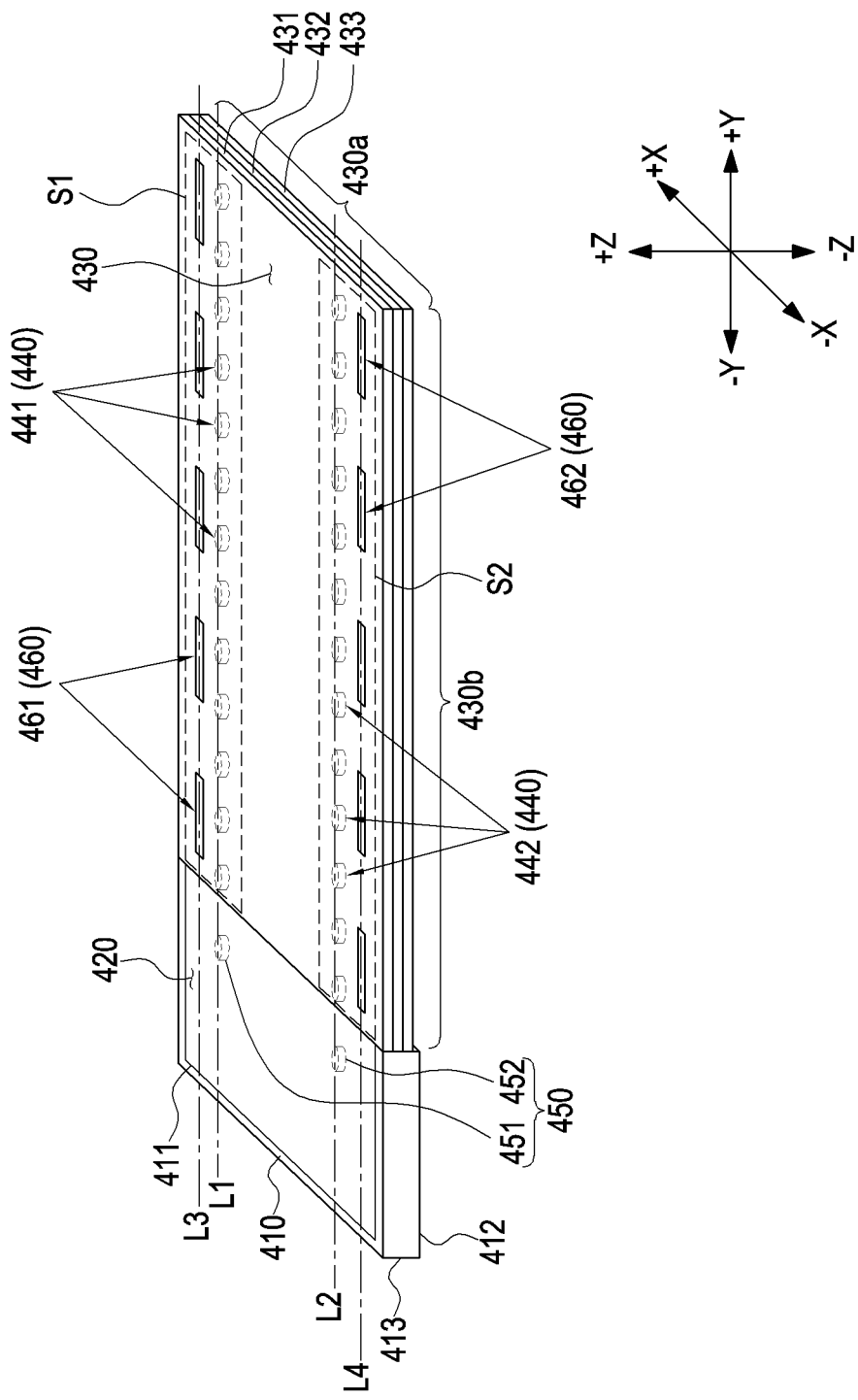
FIG. 6 is a schematic view illustrating components in an electronic device 101 including a flexible display 430 according to various embodiments of the disclosure.

FIG. 5 is a front side perspective view of an electronic device 101 according to various embodiments of the disclosure, in which a flexible display 430 is illustrated in an unfolded state. FIG. 6 is a schematic view illustrating components in an electronic device 101 including a flexible display 430 according to various embodiments of the disclosure.

Referring to FIGS. 5 and 6, the electronic device 101 according to an embodiment may include a housing 410, a display device (e.g., the display device 160 in FIG. 1) (e.g., a rigid display 420 and a flexible display 430), a plurality of magnets 440, and at least one sensor 450 or 460. The electronic device 101 of FIGS. 5 and 6 may be partially or entirely the same as the electronic device 101 of FIGS. 1 to 4.

In the unfolded display device 160 of FIGS. 5 and 6, "X" of the 3-axis orthogonal coordinate system may represent the horizontal axis of the flexible display, "Y" may represent the vertical axis of the flexible display area, and "Z" may represent the thickness direction axis of the flexible display area. In an embodiment of the disclosure, the "Z" axis may represent a first direction (+Z) and a second direction (−Z). The "X" axis may represent a third direction (+X or −X). The "Y" axis may represent a fourth direction (+Y or −Y).

According to various embodiments, the electronic device 101 may include a housing 410 including a first surface (or the front surface) oriented in the first direction (+Z), a second surface (or the rear surface) oriented in the second direction (−Z) opposite to the first direction (+Z), and a side surface surrounding a space between the first surface and the second surface. In another embodiment (not illustrated), the term "housing 410" may refer to a structure forming a part of the first surface, the second surface, and the side surface. According to an embodiment, at least a portion of the first surface may be formed by a substantially transparent front plate (e.g., a glass plate or a polymer plate including various coating layers) 411. The second surface may be formed by a substantially opaque rear plate 412. The rear plate 412 may be formed of, for example, coated or colored glass, ceramic, a polymer, a metal (e.g., aluminum, stainless steel (STS), or magnesium), or a combination of two or more of these materials. The side surface may be formed by a side bezel structure (or a side member 413) coupled to the front plate 411 and the rear plate 412 and including a metal and/or a polymer. In some embodiments, the rear plate 412 and the side bezel structure may be integrally formed, and may include the same material (e.g., a metal material such as aluminum).

According to an embodiment, the front plate 411 may include at least one area, which is bent from the first surface toward the rear plate and extends seamlessly, at each of the long opposite side edges thereof.

According to various embodiments, the electronic device 101 may include at least one of a display device 160, an audio module (e.g., the audio module 170 in FIG. 1), a sensor module (e.g., the sensor module 176 in FIG. 1), and a camera module (e.g., the camera module 180 in FIG. 1), a key input device (e.g., the input device 150 in FIG. 1), a light-emitting element, and a connector hole (e.g., the connection terminal 178 in FIG. 1). In some embodiments, in the electronic device 101, at least one of the components (e.g., the key input device or the light-emitting element) may be omitted, or other components may be additionally included.

According to various embodiments, the display device 160 may include a rigid display 420 and a flexible display 430 extending from the rigid display 420. According to various embodiments, the rigid display 420 may be exposed through a substantial portion of, for example, the front plate 411. In some embodiments, the edges of the rigid display 420 may be formed to be substantially the same as the shape of the periphery of the front plate 411 adjacent thereto. In another embodiment (not illustrated), the distance between the periphery of the rigid display 420 and the periphery of the front plate 411 may be substantially constant in order to enlarge the exposed area of the rigid display 420.

In another embodiment (not illustrated), recesses or openings may be formed in some portions of the screen display area of the rigid display 420, and one or more of an audio module 170, a sensor module 176, a camera module 180, and a light-emitting element may be aligned with the recesses or the openings. In another embodiment (not illustrated), the rear surface of the screen display area of the rigid display 420 may include at least one of an audio modules 170, a sensor module 176, a camera module 180, a sensor module (e.g., a fingerprint sensor), and a light-emitting element. In another embodiment (not illustrated), the rigid display 420 may be coupled to or disposed adjacent to a touch-sensitive circuit, a pressure sensor capable of measuring touch intensity (pressure), and/or a digitizer configured to detect a magnetic-field-type stylus pen.

According to various embodiments, the flexible display 430 may extend from an end of the rigid display 420, and may be disposed to face at least one of the front plate 411, the rear plate 412, and the side member 413. As another example, the flexible display 430 may be disposed to surround at least a portion of the front plate 411, the rear plate 412, and the side member 413. The flexible display 430 may include a flexible display panel 431 (e.g., the flexible display panel 321 or 302 in FIGS. 3 and 4), a printed circuit board 432, and a cover 433.

According to an embodiment, the flexible display panel 431 may be an image display device configured to be bent (or rolled). A printed circuit board 432 configured to process, for example, communication and/or various information may be stacked on one side of the flexible display panel 431, and, for example, a sensor module configured to detect whether or not the printed circuit board 432 is bent (or rolled), may be mounted on one side of the printed circuit board 432. The printed circuit board 432 may be a flexible printed circuit board, and may be bent (or rolled) or unfolded to correspond to the flexible display panel 431.

According to an embodiment, the cover 433 may be extended and disposed from the housing 410, and may be bent (or rolled) together with the flexible display panel 431. The cover 433 may be made of a flexible material such as leather or rubber. However, the material of the cover 433 is not limited to being made of a flexible material. A portion that is deformed into a curved shape in a bending (or rolling) operation is made of a flexible material, and a portion that is capable of maintaining a predetermined shape regardless of the bending (or rolling) operation may be made of a rigid material such as plastic or metal. Accordingly, the portion of the cover part 433 capable of maintaining the predetermined shape even in the bending (or rolling) operation may include components necessary for the electronic device 101, such as a circuit part (e.g., an antenna radiator).

According to various embodiments, the flexible display 430 may be have a relatively larger area than the rigid display 420. The flexible display 430 may have a first length 430a in the third direction (+X or −X) and a second length 430b longer than the first length 430a in the fourth direction (+Y or −Y).

According to various embodiments, depending on the degree of bending (or rolling), the flexible display 430 may be variable to a bent state (or a rolled state) so as to surround at least one surface of the rigid display 420 or the housing 410 from the flat state (e.g., see FIG. 6) of being oriented in the same direction (e.g., the first direction (+Z)) as the rigid display 420. Regarding the bent (or rolled) state, for example, the flexible display 430 may be variable to the rolled state to entirely surround one surface of the rigid display 420 and one surface of the housing 410 (e.g., FIG. 7).

According to various embodiments, if a touch screen function is integrated into the flexible display 430, various operations, such as changing an icon displayed according to a user's touch input or changing an operation mode of the electronic device, may be possible.

According to various embodiments, a plurality of magnets 440 arranged at predetermined intervals may be disposed inside the flexible display 430. For example, the plurality of magnets 440 may be disposed under or between flexible display panels 431, and may cooperate with a sensor module (e.g., a first sensor 450 and/or a second sensor(s) 460) disposed inside and/or outside the housing 410 so that the degree of bending (or rolling) of the flexible display 430 can be detected.

According to an embodiment, the plurality of magnets 440 may be disposed in an upper end area S1 and/or a lower end area S2 formed in the direction of the second length 430b of the flexible display 430. For example, in the state in which the flexible display 430 is fully unfolded, the plurality of magnets 440 may include first magnets 441 arranged at a predetermined interval in the upper end area S1 of the flexible display 430 and second magnets 442 arranged at a predetermined interval in the lower end area S2 of the flexible display 430. As another example, in the state in which at least a portion of the flexible display 430 is bent (or rolled), the first magnets 441 may form an arrangement in which at least some of the magnets are stacked or overlap each other. At least some of the second magnets 442 may also be stacked or overlap each other.

According to an embodiment, in the arrangement of the first magnets 441, the first magnets may be arranged at a predetermined interval along a first virtual line L1. For example, when each of the first magnets 441 has a circular shape, the first virtual line L1 is formed along the centers of respective circular first magnets 441, and the centers of the first magnets 441 may be arranged to be located on the same line. However, the shape of each of the first magnets 441 is not limited to the circular shape, and the first magnets 441 may be designed to have various shapes such as a polygonal shape and a plate shape including a bent portion.

According to an embodiment, in the arrangement of the second magnets 442, the second magnets may be arranged at a predetermined interval along a second virtual line L2. For example, when each of the second magnets 442 has a circular shape, the second virtual line L2 is formed along the centers of respective circular second magnets 442, and the centers of the second magnets 442 may be arranged on the same line. However, the shape of each of the second magnets 442 is not limited to the circular shape, and the first magnets 441 may be designed to have various shapes such as a polygonal shape and a plate shape including a bent portion. The first virtual line L1 and the second virtual line L2 may be arranged, for example, side by side (e.g., parallel to each other).

According to various embodiments of the disclosure, the first magnets 441 arranged along the first virtual line L1 may have the same interval. As another example, the first magnets 441 arranged along the first virtual line L1 may be arranged at different intervals. The first magnets 441 arranged in the upper end area S1 of the flexible display 430 may be arranged such that the intervals thereof gradually increase from the front end (e.g., the area adjacent to the rigid display 420) toward the rear end (e.g., the end area opposite the front end). For example, when the flexible display 430 is wound in a roll shape, the length of one layer of the roll disposed to wrap the flexible display 430 may gradually increase from the front end toward the rear end. In order to ensure that some of the first magnets 441 are located to overlap each other in the same area to correspond to the increasing length, the intervals of the first magnets 441 may be designed to gradually increase.

According to various embodiments of the disclosure, the second magnets 442 arranged along the second virtual line L2 may have the same interval. As another example, the second magnets 442 arranged along the second virtual line L2 may be arranged at different intervals. When the first magnets 441 are arranged at different intervals, the second magnets 442 may be aligned on the same axis as the first magnets 441. To this end, the second magnets 442 may be arranged to correspond to the arrangement intervals and/or size of the first magnets 441. The second magnets 442 arranged in the lower end area S2 of the flexible display 430 may be arranged such that the intervals thereof gradually increase from the front end (e.g., the area adjacent to the rigid display 420) toward the rear end (e.g., the end area opposite the front end). For example, when the flexible display 430 is wound in a roll shape, the length of one layer of the roll disposed to wrap the flexible display 430 may gradually increase from the front end toward the rear end. In order to ensure that some of the second magnets 442 are located to overlap each other in the same area to correspond to the increasing length, the intervals of the second magnets 442 may be designed to gradually increase. As another example, the second magnets 442 disposed at the lower end S2 of the flexible display 430 may be arranged such that the intervals thereof gradually increase from the front end toward end so as to correspond 1:1 to those of the first magnets 441 disposed at the upper end area S1.

According to various embodiments, the plurality of magnets 440 may be disposed to correspond to the positions (e.g., intervals) of the first sensor 450 and/or the second sensor(s) 460. For example, among the plurality of magnets 440, the first magnets 441 may be disposed to face one or more of the first sensors 450, and the second magnets 442 may be disposed to face remaining ones of the first sensors 460. As another example, among the plurality of magnets 440, the first magnets 441 may be disposed to be parallel to one or more of the second sensors, and the second magnets 442 may be disposed to be parallel to remaining ones of the second sensors.

According to various embodiments, the magnetic force provided by the plurality of magnets 440 is provided to the first sensor 450 and/or the second sensor(s) 460 so that the degree of bending (or rolling) of the flexible display 430 can be detected. For example, depending on the degree of bending (rolling) of the flexible display 430, the positions at which the plurality of magnets 440 are arranged are variable, and the magnetic force varied in response thereto can be detected by the first sensor 450 and/or the second sensor(s) 460. As another example, the plurality of magnets 440 is capable of helping maintain the bent (or rolled) portions of the flexible display 430 by mutual attraction of the magnets 440. Hereinafter, the first sensor 450 and the second sensor(s) 460 will be described.

According to various embodiments, a first sensor 450 may be mounted inside the rigid 420. The first sensor 450 may generate an electrical signal or a data value corresponding to an internal operating state or an external environmental state of the electronic device 101. For example, the first sensor 450 may detect the degree of bending (or rolling) of the flexible display 430 by detecting magnetic force provided by the plurality of magnets 440 disposed in the flexible display 430. For example, the first sensor 450 may detect the number of times of rolling the flexible display 430 in cooperation with the plurality of magnets 440.

According to an embodiment, the first sensor 450 may include a Hall sensor, and there may be provided a plurality of first sensors. For example, the first sensors 450 may include a (1-1)th sensor 451 disposed adjacent to at least some of the first magnets 441 and a (1-2)th sensor 452 disposed adjacent to at least some of the second magnets 442. The (1-1)th sensor 451 and the (1-2)th sensor 452 may be disposed adjacent to the flexible display 430 in the vicinity of an edge of the rigid display 420.

According to an embodiment, the (1-1)th sensor 451 may be disposed on the first virtual line L1. For example, when the (1-1)th sensor 451 is provided in a circular plate shape, the (1-1)th sensor may be disposed such that the center thereof is positioned on the same line as the centers of the circular first magnets 441. However, the shape of the (1-1)th sensor 451 is not limited to the circular plate shape, and the (1-1)th 451 may be designed to have various shapes such as a polygonal shape and a plate shape including a bent portion.

According to an embodiment, the (1-2)th sensor 452 may be disposed on the second virtual line L2. For example, when the (1-2)th sensor 452 is provided in a circular plate shape, the (1-2)th sensor 452 may be disposed such that the center thereof is positioned on the same line as the centers of the circular second magnets 442. However, the shape of the (1-2)th sensor 452 is not limited to the circular plate shape, and the (1-1)th 451 may be designed to have various shapes such as a polygonal shape and a plate shape including a bent portion. The first sensor 450 and the second sensor(s) 460 may be arranged to be parallel to each other.

According to an embodiment, the (1-1)th sensor 451 may detect the magnetic force of the first magnets 441 and/or the second magnets 442. For example, the (1-1)th sensor 451 may identify the magnitude of the magnetic force of the first magnets 441 arranged on the first virtual line L1. When the virtual first line L1 forms a straight line, strong magnetic force can be detected from a first magnet disposed adjacent to the first sensor 450, and weak magnetic force can be detected from a first magnet disposed at a distance from the first sensor 450. According to another embodiment, when the first virtual line L1 is bent (or rolled) or is deformed in a roll shape, the number of first magnets disposed adjacent to the first sensor 450 is relatively increased, and thus magnetic force stronger than previous magnetic force can be detected. Accordingly, the degree of bending (or rolling) of the flexible display 430 may be detected by comparing the sum of the magnitudes of detected magnetic force with preset data.

According to various embodiments, one or more second sensors 460 disposed adjacent to the plurality of magnets 440 may be disposed in the flexible display 430. The second sensor(s) 460 may generate an electrical signal or a data value corresponding to an internal operating state or an external environmental state of the electronic device 101. For example, the second sensor(s) 460 may detect the degree of bending (or rolling) of the flexible display 430 by detecting magnetic force provided by the plurality of magnets 440 disposed in the flexible display 430. For example, the second sensor(s) 460 may be made of, for example, a piezo material, and may be a sensor capable of generating a voltage (or current) when the flexible display 430 is bent, and may be thus capable of measuring a bending pressure applied thereto. The second sensor(s) 460 may more accurately detect the degree of bending (or rolling) of the flexible display 430 in cooperation with the first sensor 450.

According to an embodiment, the second sensor(s) 460 may include a bending (or rolling) sensor, and there may be provided a plurality of second sensors. For example, the second sensor(s) 460 may be disposed under or between the flexible display panels 431, and may include a (2-1)th sensor 461 disposed adjacent to at least some of the first magnets 441 and a (2-2)th sensor 462 disposed adjacent to at least some of the second magnets 442.

According to an embodiment, the second sensor(s) 460 may be disposed in the upper end area S1 and/or the lower end area S2 formed in the direction of the second length 430b of the flexible display 430. For example, in the state in which the flexible display area is fully unfolded, the plurality of second sensors 460 may include (2-1)th sensors 461 arranged at a predetermined interval in the upper end area S1 of the flexible display 430 and (2-2)th sensors 462 arranged at a predetermined interval in the lower end area S2 of the flexible display 430. As another example, in the state in which at least a portion of the flexible display 430 is bent (or rolled), at least some of the (2-1)th sensors 461 may form an arrangement in which at least some of the sensors Are stacked or overlap each other. At least some of the (2-2) sensors 462 may also be stacked or overlap each other.

According to an embodiment, when viewed from the outside, the (2-1)th sensors 461 and the (2-2) sensors 462 may be mounted on the rear surface of the flexible display 430 or inside the flexible display 430 such that the (2-2) sensors 462 are not visually recognized by an external object such as a user. As another example, the sensors may be arranged at appropriate intervals such that the flexible display 430 can be wound in a roll shape or can be bent (or rolled) in a specific shape without being disturbed.

According to an embodiment, in the arrangement of the (2-1)th sensors 461, the (2-1)th sensors may be arranged at a predetermined interval along a third virtual line L3. For example, when each of the (2-1)th sensors 461 has a quadrangular plate shape, the third virtual line L3 is formed along the centers of respective quadrangular (2-1)th sensors 461, and the centers of the quadrangular (2-1)th sensors 461 may be arranged on the same line. However, the shape of the (2-1)th sensor 461 is not limited to the quadrangular plate shape, and the (2-1)th 461 may be designed to have various shapes such as a polygonal shape and a shape including a bent portion. The third virtual line L3 may be parallel to the first virtual line L1.

According to an embodiment, in the arrangement of the (2-2)th sensors 462, the (2-2)th sensors may be arranged at a predetermined interval along a fourth virtual line L4. For example, when each of the (2-2)th sensors 462 has a quadrangular plate shape, the fourth virtual line L4 is formed along the centers of respective quadrangular (2-2)th sensors 462, and the centers of the quadrangular (2-2)th sensors 462 may be arranged on the same line. However, the shape of the (2-2)th sensor 462 is not limited to the quadrangular plate shape, and the (2-2)th 462 may be designed to have various shapes such as a polygonal shape and a shape including a bent portion. The fourth virtual line L4 and the second virtual line L2 may be arranged side by side (e.g., parallel to each other). As another example, the third virtual line L3 and the fourth line L4 may be arranged side by side.

According to various embodiments, the (2-1)th sensors 461 arranged along the third virtual line L3 may have the same interval. As another example, the (2-1)th sensors 461 arranged along the third virtual line L3 may be arranged at different intervals. The (2-1)th sensors 461 arranged in the upper end area S1 of the flexible display 430 may be arranged such that the intervals thereof gradually increase from the front end (e.g., the area adjacent to the rigid display 420) toward the rear end (e.g., the end area opposite the front end). For example, when the flexible display 430 is wound in a roll shape, the length of one layer of the roll disposed to wrap the flexible display 430 may gradually increase from the front end toward the rear end. In order to ensure that some of the (2-1)th sensors 461 are located to overlap each other in the same area to correspond to the increasing length, the intervals of the (2-1)th sensors 461 may be designed to gradually increase. As another example, the (2-1)th sensors 461 may be arranged to have intervals different from those of the first magnets 441, at least one of the (2-1)th sensors 461 may be located at an appropriate distance from the first magnets 441 disposed adjacent thereto so as to accurately detect whether or not the magnetic force of the first magnets 441 varies.

According to various embodiments, the (2-2)th sensors 462 arranged along the fourth virtual line L4 may have the same interval. As another example, the (2-2)th sensors 462 arranged along the fourth virtual line L4 may be arranged at different intervals. The (2-2)th sensors 462 arranged in the lower end area S2 of the flexible display 430 may be arranged such that the intervals thereof gradually increase from the front end (e.g., the area adjacent to the rigid display 420) toward the rear end (e.g., the end area opposite the front end). For example, when the flexible display 430 is wound in a roll shape, the length of one layer of the roll disposed to wrap the flexible display 430 may gradually increase from the front end toward the rear end. In order to ensure that some of the (2-2)th sensors 462 are located to overlap each other in the same area to correspond to the increasing length, the intervals of the (2-2)th sensors 462 may be designed to gradually increase. As another example, the (2-2)th sensors 462 may be arranged to have intervals different from those of the second magnets 442, at least one of the (2-2)th sensors 462 may be located at an appropriate distance from the second magnets 442 disposed adjacent thereto so as to accurately detect whether or not the magnetic force of the second magnets 442 varies.

According to an embodiment, the second sensor(s) 460 may detect the magnetic force of the first magnets 441 and/or the second magnets 442. For example, the (2-1)th sensor(s) 461 may identify the magnitude of the magnetic force of the first magnets 441 arranged on the first virtual line L1. When the virtual first line L1 forms a straight line (e.g., when the flexible display 430 is unfolded), strong magnetic force can be detected from a first magnet disposed adjacent to the (2-1)th sensor 461, and weak magnetic force can be detected from a first magnet disposed at a distance from the (2-1)th sensor 461. In contrast, when the first virtual line L1 is bent (or rolled) or is deformed in a roll shape (e.g., when the flexible display 430 is bent (or rolled) or is deformed in a roll shape), the number of first magnets disposed adjacent to some of the (2-1)th sensors 461 is relatively increased, and thus magnetic force stronger than previous magnetic force can be detected. As another example, the positions of the first magnets can be accurately detected in cooperation with the (2-1)th sensors 461 disposed adjacent thereto. Accordingly, the degree of bending (or rolling) of the flexible display 430 may be detected by comparing information obtained by combining the magnitudes of detected magnetic force and the positions of the first magnets with preset data.

According to various embodiments, the sensor module of the electronic device 101 may include various sensors in addition to the first sensor 450 and the second sensor(s) 460. The sensor module may include, for example, a proximity sensor and/or a fingerprint sensor disposed on the front plate 411 of the housing 410, and/or an HRM sensor and/or a fingerprint disposed on the rear plate 412 of the housing 410. The fingerprint sensor may be disposed not only on the first surface (e.g., the rigid display 420) of the housing 410, but also on the second surface. The electronic device 101 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

Figure 7:
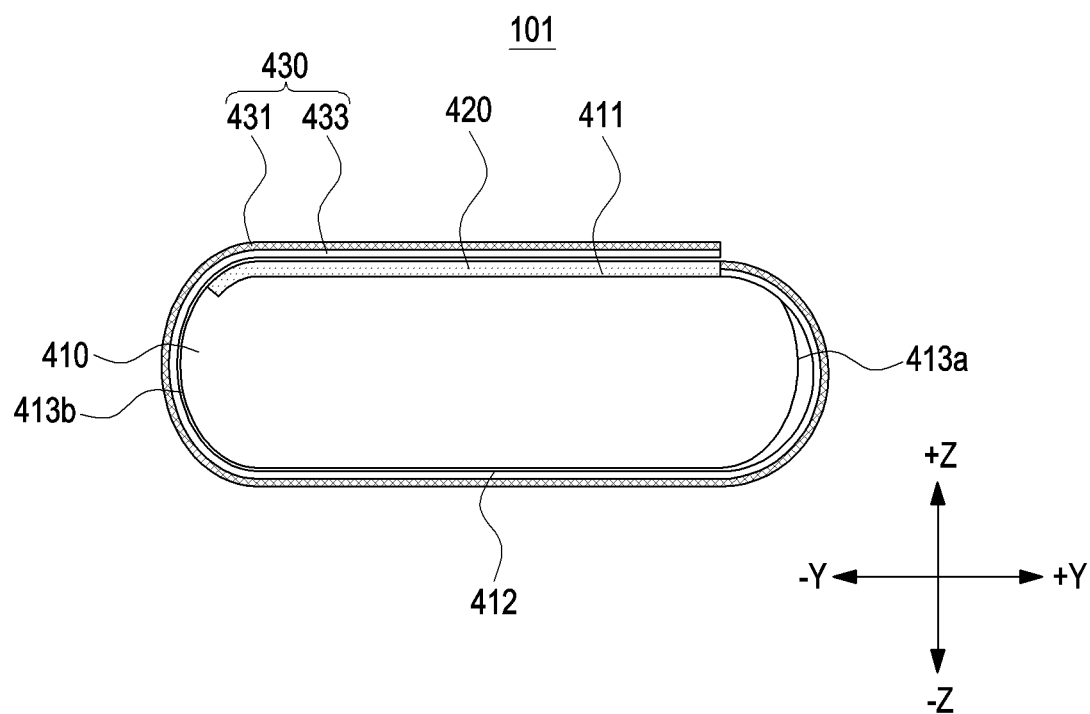
FIG. 7 is a cross-sectional view of an electronic device 101 according to various embodiments of the disclosure when a flexible display 430 has a bent shape.
Figure 8:
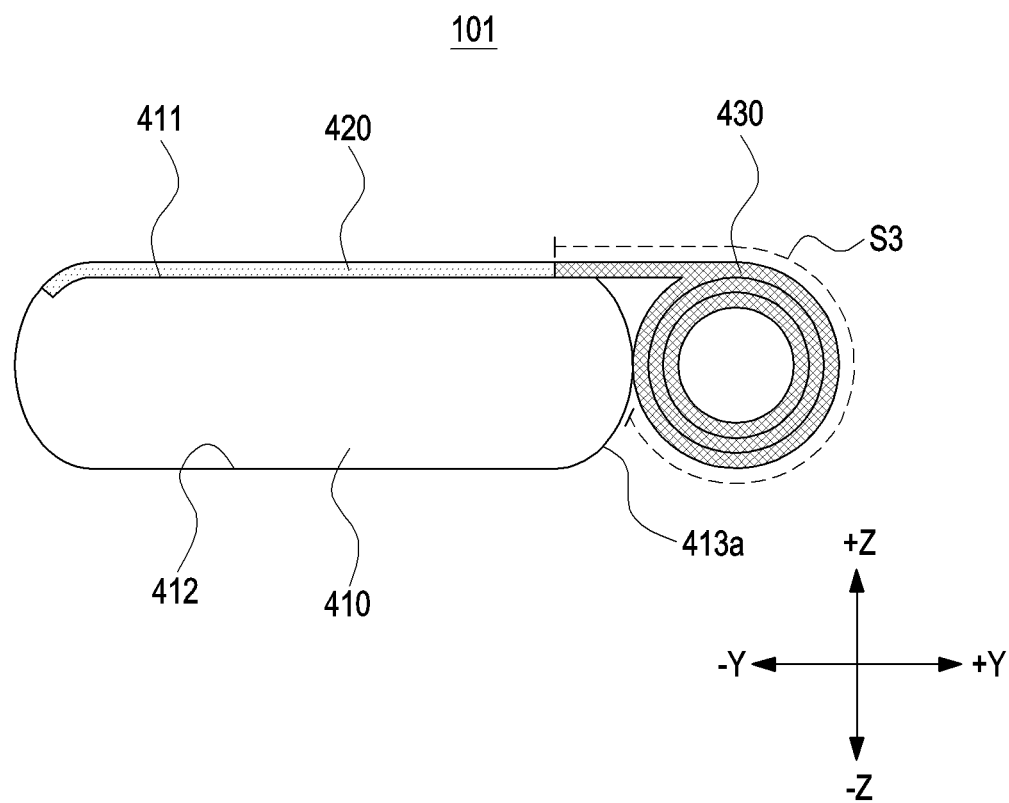
FIG. 8 is a cross-sectional view of an electronic device 101 according to various embodiments of the disclosure when a flexible display 430 has a rolled shape.

FIG. 7 is a cross-sectional view of an electronic device 101 according to various embodiments of the disclosure when a flexible display 430 has a bent shape. FIG. 8 is a cross-sectional view of an electronic device 101 according to various embodiments of the disclosure when a flexible display 430 has a rolled shape.

Referring to FIGS. 7 and 8, the electronic device 101 according to an embodiment may include a housing 410, a rigid display 420, and a flexible display 430. The housing 410, the rigid display 420, and the flexible display 430 of the electronic device 101 of FIGS. 7 and 8 may be partially or entirely the same as the housing 410, the rigid display 420, and the flexible display 430 of the electronic device 101 of FIGS. 5 and 6.

In FIGS. 7 and 8, "Y" in the 2-axis orthogonal coordinate system may represent the width direction of the housing, and "Z" may represent the thickness direction of the housing. In an embodiment of the disclosure, the "Z" axis may represent a first direction (+Z) and a second direction (−Z). The "Y" axis may represent a fourth direction (+Y or −Y).

According to various embodiments, the electronic device 101 may include the housing 410 in which electronic components are mounted, and the rigid display 420 disposed on one surface of the housing 410, and the flexible display 430 may extend from an end of the rigid display 420 and may be bent and rolled according to a user's intention.

Referring to FIG. 7, the flexible display 430 may be disposed to surround at least a portion of the rigid display 420 and/or the housing 410 so as to protect a partial area of the electronic device 101. For example, the flexible display 430 may have a first length (e.g., the first length 430a in FIG. 6) and a second length (e.g., the second length 430b in FIG. 6) that is longer than the first length 430a. The first length 430a may be parallel with vertical length direction of the housing 410 and/or the rigid display 420 and may correspond to the vertical length, and the second length 430b may be longer than the first length 430a so as to surround each of the surfaces of the housing 410. Accordingly, the flexible display 430 may cover the front surface of the rigid display 420 from an end of the rigid display 420 disposed on the front plate 411 via one side surface (e.g., a first side surface 413a), the rear plate 412, and the other side surface (e.g., the second side surface 413b) of the housing 410. As another example, when the flexible display 430 is arranged to surround the rigid display 420 and/or the front surface of the housing 410, the user is able to use the entire area of the flexible display (e.g., the front surface, rear surface, and side surface of the housing 410) in which visibility is secured.

According to various embodiments, the flexible display 430 may include a flexible display panel 431 and a cover 433. The cover 433 may cover the rear surface of the flexible display panel 431, and may be made of a flexible material such as leather or rubber. The cover 433 of the flexible display 430 may be disposed to face the housing 410 and/or the front surface of the rigid display 420, and the flexible display panel 431 may be disposed so as to face the housing 410 and/or the rigid display 420 so as to substantially form an outer surface. When the flexible display panel 431 surrounds the outer surface of the electronic device 101, the surface exposed to a user's field of view may generally provide an aesthetic design of the electronic device 101.

Referring to FIG. 8, the flexible display 430 may be disposed in a bent (or rolled) state on one side of the rigid display 420 and/or the housing 410. For example, the flexible display 430 may be fixed in a state of being wound in a roll shape, and may be disposed adjacent to the side member or the first side 413a of the housing 410.

According to various embodiments, the flexible display 430 may include a flexible display panel 431 and a cover 433. When the flexible display 430 is wound in the roll shape, at least a partial area S3 of the flexible display panel 431 may be provided in the state of being exposed to the outside. The user may directly grip the exposed partial area S3 of the wound flexible display 430 so as to carry the electronic device 101. As another example, the display panel 431 exposed in the wound flexible display 430 may display some necessary information and perform an operation. As the partial area S3 of the flexible display 430 is exposed, various kinds of information, such as weather information, time, phone reception, text message reception, may be output through the flexible display 430. Accordingly, the user may use the electronic device 101 while checking various information through the display panel even in the state in which the flexible display 430 is wound in the roll shape.

Figure 9:
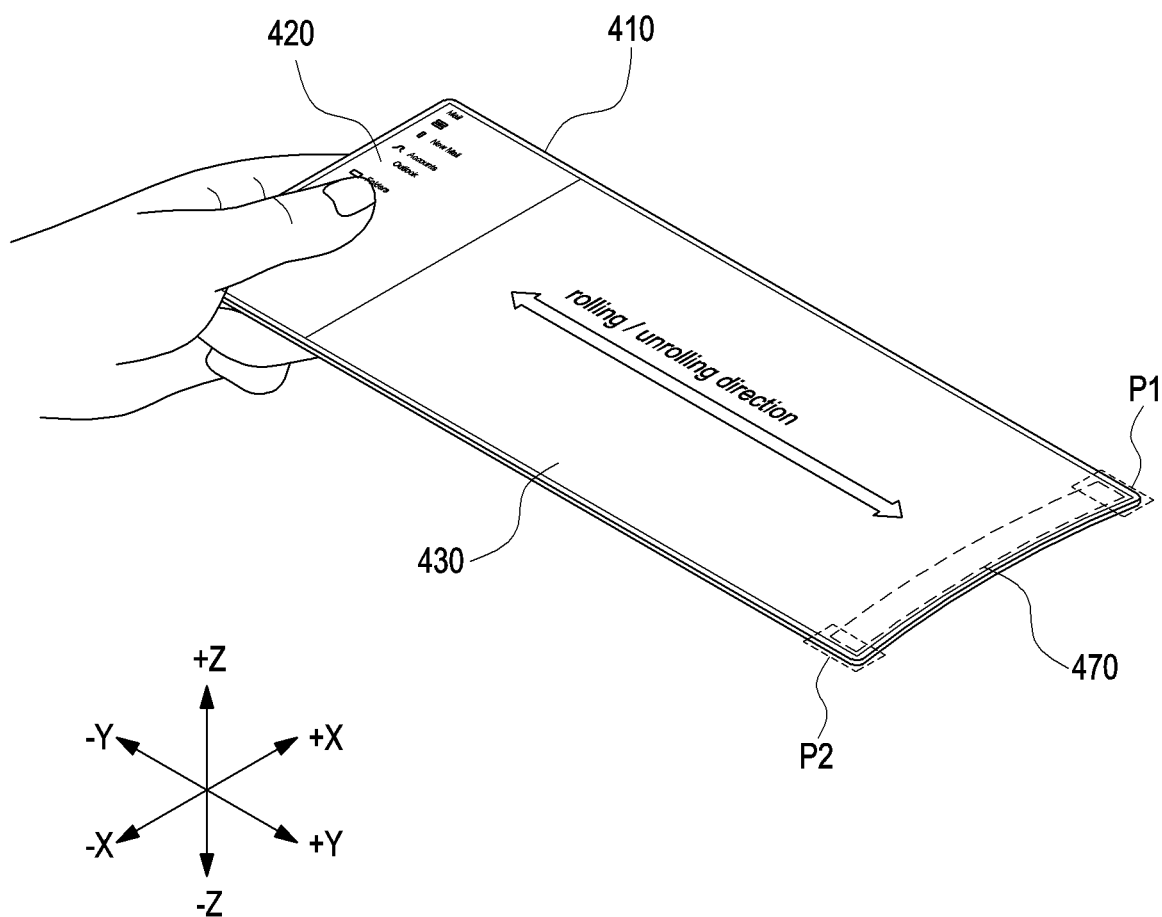
FIG. 9 is a perspective view of an electronic device 101 according to various embodiments of the disclosure, in which a support member 470 is disposed to provide flatness to the flexible display 430.
Figure 10:
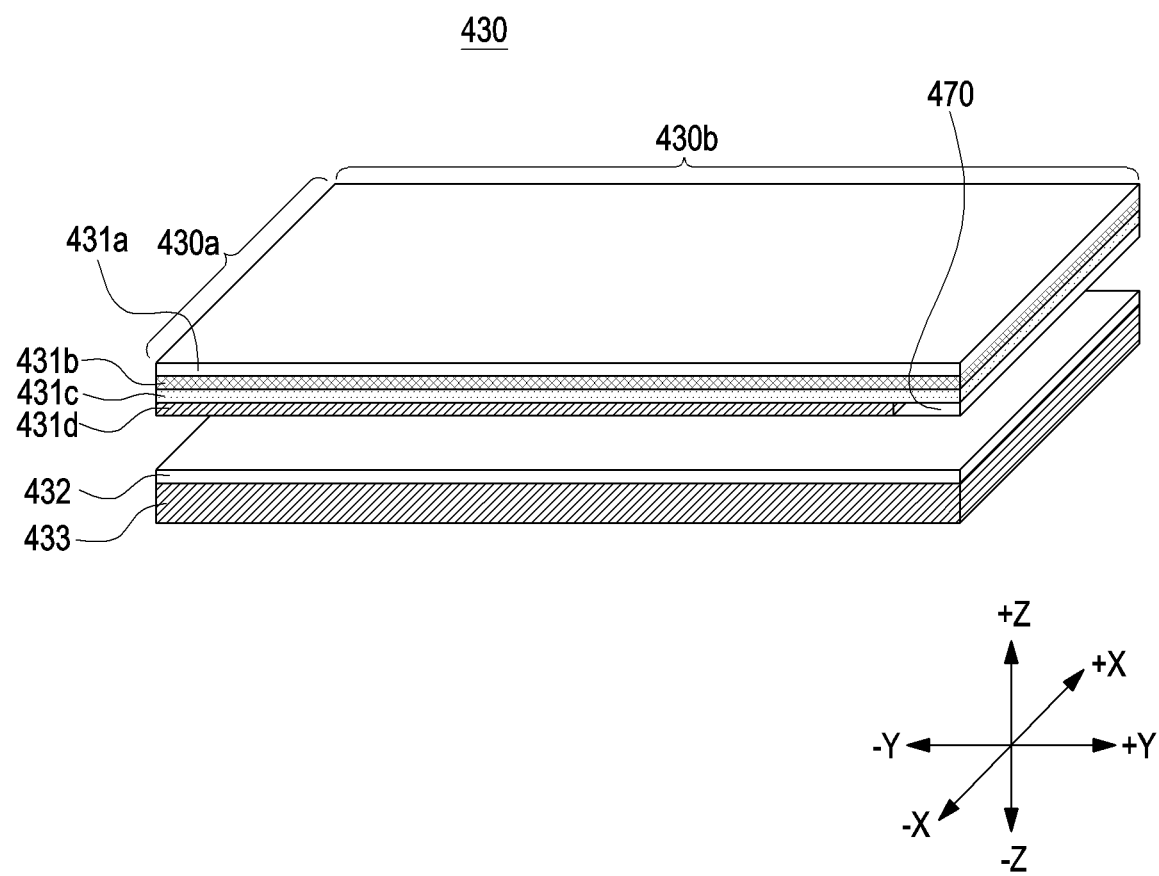
FIG. 10 is a cross-sectional view illustrating a cross section of the flexible display 430 according to various embodiments.

FIG. 9 is a perspective view of an electronic device 101 according to various embodiments of the disclosure, in which a support member 470 is disposed to provide flatness to the flexible display 430. FIG. 10 is a cross-sectional view illustrating a cross section of the flexible display 430 according to various embodiments.

Referring to FIGS. 9 and 10, the electronic device 101 according to an embodiment may include a housing 410, a rigid display 420, and a flexible display 430. The housing 410, the rigid display 420, and the flexible display 430 of the electronic device 101 of FIGS. 9 and 10 may be partially or entirely the same as the housing 410, the rigid display 420, and the flexible display 430 of the electronic device 101 of FIGS. 4 and 5.

In the unfolded flexible display of FIGS. 9 and 10, "X" of the 3-axis orthogonal coordinate system may represent the horizontal axis of the flexible display, "Y" may represent the vertical axis of the flexible display, and "Z" may represent the thickness direction axis of the flexible display. In an embodiment of the disclosure, the "Z" axis may represent a first direction (+Z) and a second direction (−Z). The "X" axis may represent a third direction (+X or −X). The "Y" axis may represent a fourth direction (+Y or −Y).

According to various embodiments, the electronic device 101 may include a support member 470 for maintaining the flatness of the flexible display 470 in the state in which the flexible display 430 is unfolded. The support member 470 may be mounted on one end of the flexible display panel 431 of the flexible display 430.

According to various embodiments, the flexible display 430 may include a flexible display panel 431, a printed circuit board 432, and a cover 433. The flexible display panel 431 may be configured by stacking a plurality of layers. For example, a window layer 431a may be disposed on the outer surface of the flexible display panel 431 to cover the front surface of the display device 430 oriented in the first direction (+Z). An organic light-emitting diode (OLED) layer 431b may be disposed under the window layer 431a, and a thin film transistor layer (TFT) layer 431c may be stacked under the OLED layer 431b. A base layer 431d and a support member 470 may be disposed between the TFT layer 431c and the printed circuit board 432.

According to various embodiments, the flexible display 430 may have a first length 430a in the third direction (+X or −X) and a second length 430b longer than the first length 430a in the fourth direction (+Y or −Y). As the flexible display 430 is bent along the fourth direction (+Y or −Y), the flexible display 430 may be deformable to a rolling or unrolling structure, and may thus be flexible in the direction of the second length 430b. In contrast, in order to maintain the flexible display 430 in the fully unfolded state, the flexible display 430 should have a predetermined flatness in the third direction (+X or −X). In order to maintain the flatness of the flexible display 430 in the unfolded state, the flexible display 430 may extend from the base layer 431d, and a support member 470 may be disposed at one end of the flexible display 430.

According to various embodiments, the support member 470 may form a straight line or a deformed line having a predetermined curvature. The support member 332 may be coupled to the flexible display panel 431 on at least one surface oriented in the first direction (+Z) and/or the third direction (+X or −X), and the fourth direction (+Y or −Y), and may be coupled to the printed circuit board 340 on the other surface 431 oriented in the second direction (−Z). For example, the support member 470 may be formed on the same plane (e.g., the same layer) parallel to the base layer 431d. The support member 470 may be formed along the edge line of the flexible display 430, and may include an elastic material or a glass material. When the support member 470 is made of an elastic material (e.g., a leaf spring), a predetermined curvature may be formed when the upper end P1 and/or the lower end P2 thereof are flexed toward the printed circuit board 432 (e.g., in the second direction (−Z) together with at least a portion of the base layer 431d. Accordingly, it is possible to maintain the fixed or supported flatness in the unfolded state of the flexible display 430. The base layer 431d may include polyimide or a polymer to maintain flexibility together with the support member 470.

According to various embodiments, the support member 470 may be disposed at one end of the flexible display 430, and may be provided in a length corresponding to the first length 430a. The width of the support member 470 may correspond to a portion of the second length 430b. For example, the width of the support member 470 may be about 1 to 10% of the entire second length 430b of the flexible display 430. According to an embodiment, the support member 470 including the elastic material may maintain the flat state in the wound state, and may partially form a predetermined curvature in the unfolded state. Since the flexible display 430 maintains the flatness thereof in the unfolded state, the user may use the electronic device 101 with one hand for reading and/or browsing.

According to various embodiments, a configuration in which a plurality of support members 470 are provided is possible, in addition to the configuration in which the support member is disposed only at an end of the flexible display 430. For example, in the unfolded state, the support members 470 may be arranged side by side at predetermined intervals in order to further improve the flatness of the flexible display 430. The intervals of the plurality of support members disposed along the second length 430b may be the same. As another example, the plurality of support members disposed along the second length 430b may be arranged at different intervals. When the support members are arranged at different intervals, the support members may be disposed not to overlap the magnets (e.g., the magnets 440 in FIG. 6) and/or the sensors (e.g., the sensors 450 and 460 in FIG. 6) disposed inside the flexible display 430 so that interference due to bending (or rolling) does not occur.

According to various embodiments, a printed circuit board 432 and a cover 433 may be disposed under the flexible display 431. The printed circuit board 432 may include a flexible printed circuit board, and may be electrically connected to the flexible display panel 431. As another example, various types of sensors may be mounted on the printed circuit board 432. According to an embodiment, the cover 433 may cover the rear surface of the flexible display panel 431, and may be made of a flexible material such as leather or rubber. When the cover 433 surrounds the outer surface of the electronic device 101, the surface exposed to a user's field of view may generally provide an aesthetic design of the electronic device 101.

Figure 11A:
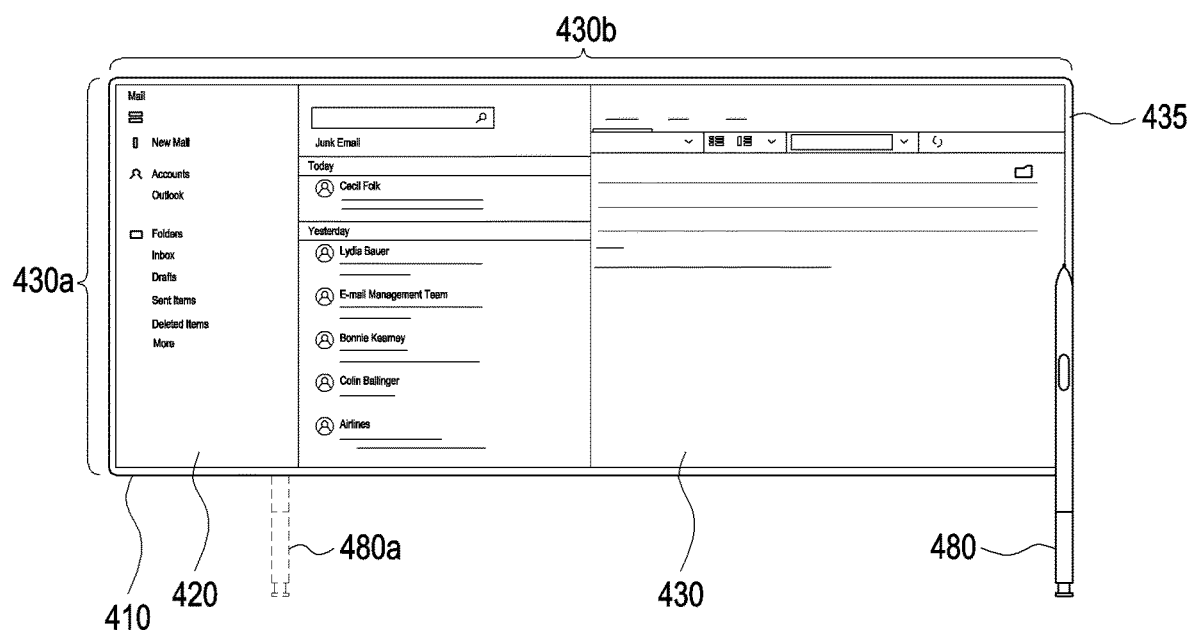
FIGS. 11A and 11B are schematic views of an electronic device 101 according to various embodiments of the disclosure, in which an accessory is disposed to provide flatness to the flexible display 430.
Figure 11B:
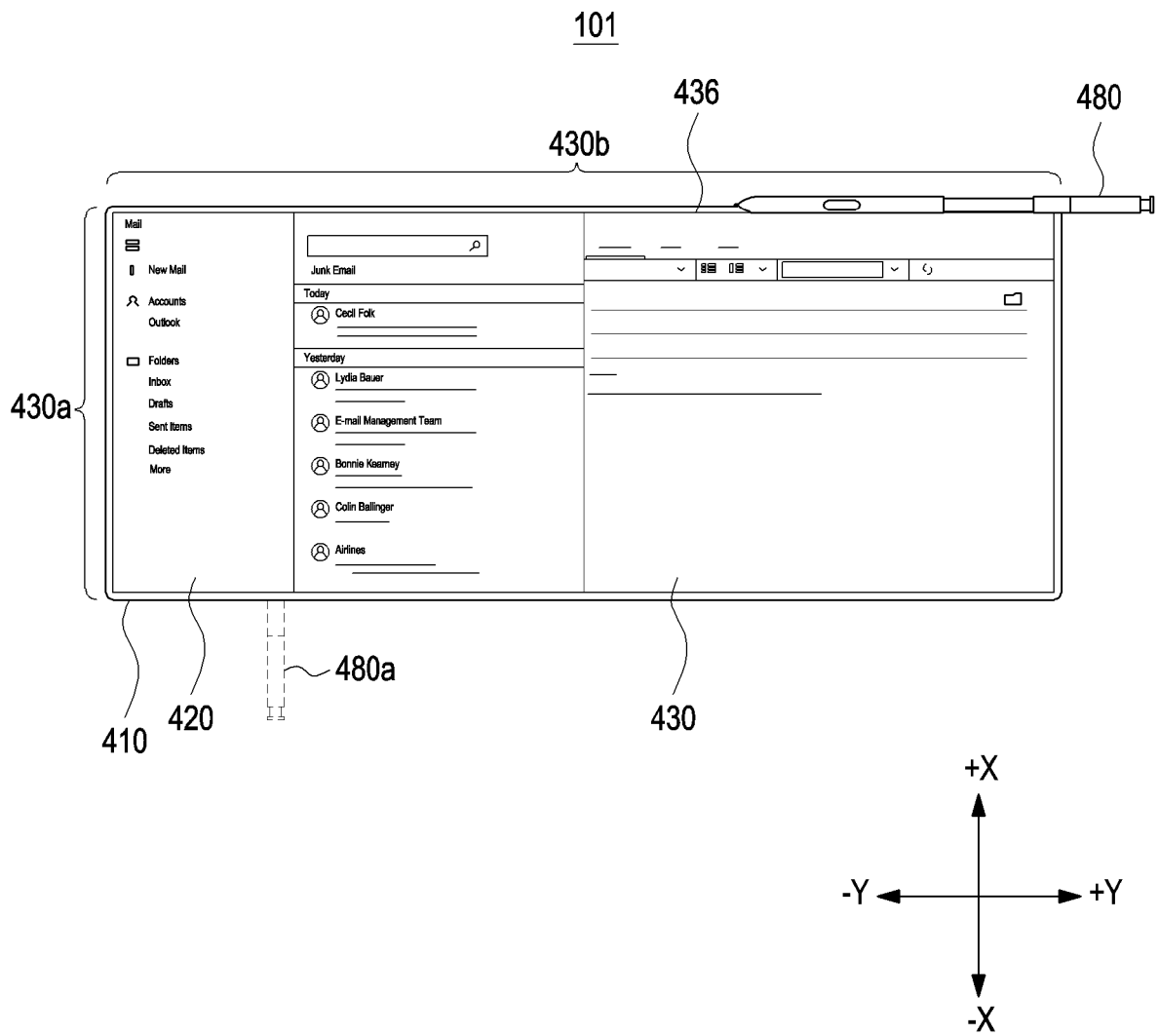

FIGS. 11A and 11B are schematic views of an electronic device 101 according to various embodiments of the disclosure, in which an accessory is disposed to provide flatness to the flexible display 430.

Referring to FIGS. 11A and 11B, according to an embodiment, the electronic device 101 may include a housing 410, a rigid display 420, and a flexible display 430. The housing 410, the rigid display 420, and the flexible display 430 of the electronic device 101 of FIGS. 11A and 11B may be partially or entirely the same as the housing 410, the rigid display 420, and the flexible display 430 of the electronic device 101 of FIGS. 4 and 5.

In the unfolded flexible display device of FIGS. 11A and 11B, "X" of the 2-axis orthogonal coordinate system may represent the horizontal axis of the flexible display, and "Y" may represent the vertical axis of the flexible display. In an embodiment of the disclosure, the "X" axis may represent a third direction (+X or −X), and the "Y" may represent a fourth direction (+Y or −Y).

According to various embodiments, in the electronic device 101, a stylus pen 480 may be used for maintaining the flatness of the flexible display 430 in the state in which the flexible display 430 is unfolded. For example, the electronic device 101 include a stylus pen 480, which is capable of being inserted into a reception groove disposed in the housing 410 and is used as an input device. The dotted line 480a represents a form in which the stylus pen 480 is partially inserted into the reception groove. According to an embodiment, the stylus pen 480 may be used as an additional device for manipulating a touch panel. In general, the touch panel may sense a portion of the user's body, for example, a finger, coming close to or touching the same. For example, the stylus pen 480 may be used to input detailed input, for example, handwriting or sketch. The stylus pen 480 itself may generate an input signal by transmitting minute current of the user's body to the touch panel. According to various embodiments, a separate resonance circuit is embedded in the stylus pen 480, and may cooperate with a digitizer sheet (e.g., an FPCB sheet containing a loop pattern) mounted on the electronic device 101.

According to various embodiments, the stylus pen 480 may be fixed to one side of the flexible display 430 in order to maintain the flatness of the flexible display 430 in the unfolded state. For example, at one side of the stylus pen 480, grooves and/or protrusions corresponding to the protrusions and/or grooves in the flexible display 430 may be disposed in order to support the flexible display 430 through binding such as fitting.

According to various embodiments, the flexible display 430 may have a first length 430a in the third direction (+X or −X) and a second length 430b longer than the first length 430a in the fourth direction (+Y or −Y). Referring to FIG. 11A, the stylus pen 480 may be coupled to a first end 435 having the first length 430a of the flexible display 430. The first end 435 is an edge area of the flexible display 430, and the stylus pen 480 may be slidably coupled to the first end 435 in the third direction (+X or −X). Accordingly, it is possible to maintain the fixed or supported flat state in the unfolded state of the flexible display 430.

Referring to FIG. 11B, the stylus pen 480 may be coupled to a second end 436 having the second length 430b of the flexible display 430. The second end 436 is an edge area of the flexible display 430, and the stylus pen 480 may be slidably coupled to the second end 436 in the fourth direction (+Y or −Y). When the stylus pen 480 includes a variable structure, the length of the stylus pen 480 may be increased like an antenna pole, and may be coupled to the second end 436 using the increased length. Accordingly, it is possible to maintain the fixed or supported flat state in the unfolded state of the flexible display 430.

Figure 12:
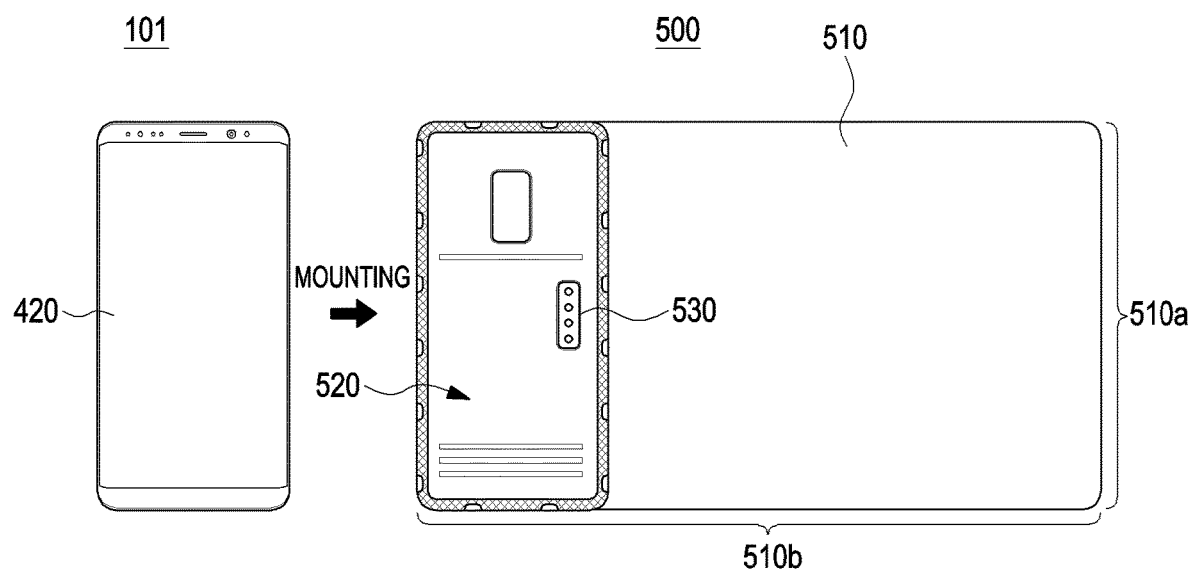
FIG. 12 is a schematic view illustrating an accessory device including a flexible display 430 according to various embodiments of the disclosure.

FIG. 12 is a schematic view illustrating components in an electronic device 101 including an accessory device including a flexible display 430 according to various embodiments of the disclosure.

Referring to FIG. 12, according to an embodiment, the electronic device 101 may include a rigid display 420, and may be provided in a configuration that can be mounted with the accessory device 500 on one surface thereof. The accessory device 500 coupled to the electronic device 101 may include a rear cover 520, a connector 530, and a flexible display 510. The electronic device 101 of FIG. 12 may be partially or entirely the same as the electronic device 101 of FIG. 1, and the flexible display 510 of FIG. 12 may be partially or entirely the same as the flexible display 430 of FIGS. 5 and 6.

According to various embodiments, the rear cover 520 of the accessory device 500 may be made of an opaque material capable of covering the rear area and providing an aesthetic feeling when mounted on the electronic device 101. The rear cover 520 of the accessory device 500 may be formed of, for example, coated or colored glass, ceramics, polymer, metal (e.g. aluminum, stainless steel (STS), or magnesium), or a combination of at least two of these materials. As another example, the rear cover 520 of the accessory device 500 may be made of a flexible material such as leather or rubber.

According to various embodiments, the accessory device 500 may include a connector 530 inside the rear cover 520. The connector 530 is configured to transmit and receive power and/or data, and may be provided with at least one terminal so as to deliver signals between the flexible display 430 and the electronic device 101. The connector 530 may be a pin that enables electrical contact, and may be implemented using contactless means, such as wireless communication (e.g., Wi-Fi, Bluetooth, wireless USB, WiGig, or mmWave) and wireless charging.

According to various embodiments, the accessory device 500 may include a flexible display 510 capable of being bent (or rolled). The flexible display 510 is a component for providing convenience to a user by providing a screen with a wide area other than a display device (e.g., the rigid display 420) mounted inside the existing electronic device 101, and may have a relatively larger area than the display device. The flexible display 510 may have a first length 510a in the horizontal axis direction and a second length 510b that is longer than the first length 510a in the vertical axis direction. For example, depending on the degree of bending (or rolling), the flexible display 510 may be variable from a flat state, in which the flexible display 510 is oriented in the same direction as the display device of the electronic device 101 to a state in which the flexible display 510 is disposed to surround at least one surface of the electronic device 101. As another example, the flexible display 510 may be provided in various display resolutions (e.g., 300 ppi, 500 ppi, and 1000 ppi) and sizes (inch), which may be selected by the user.

According to various embodiments, if a touch screen function (e.g., the touch circuit 250 in FIG. 2) is included in the flexible display 510, various operations such as changing an icon displayed according to a user's touch input or changing an operation mode of the electronic device may be possible. According to an embodiment, a plurality of magnets (e.g., the magnets 440 in FIG. 6) arranged at predetermined intervals may be disposed inside the flexible display 510. For example, the plurality of magnets 440 may be disposed under or between flexible display panels (e.g., the flexible display panels 431 in FIG. 6) 431, and may cooperate with a sensor module (e.g., a first sensor 450 and/or a second sensor(s) 460 in FIG. 6) disposed inside the housing 410 so that the degree of bending (or rolling) of the flexible display 510 can be detected.

Hereinafter, various scenarios according to the variable degree of the flexible display area of the electronic device 101 will be described.

Figure 13:
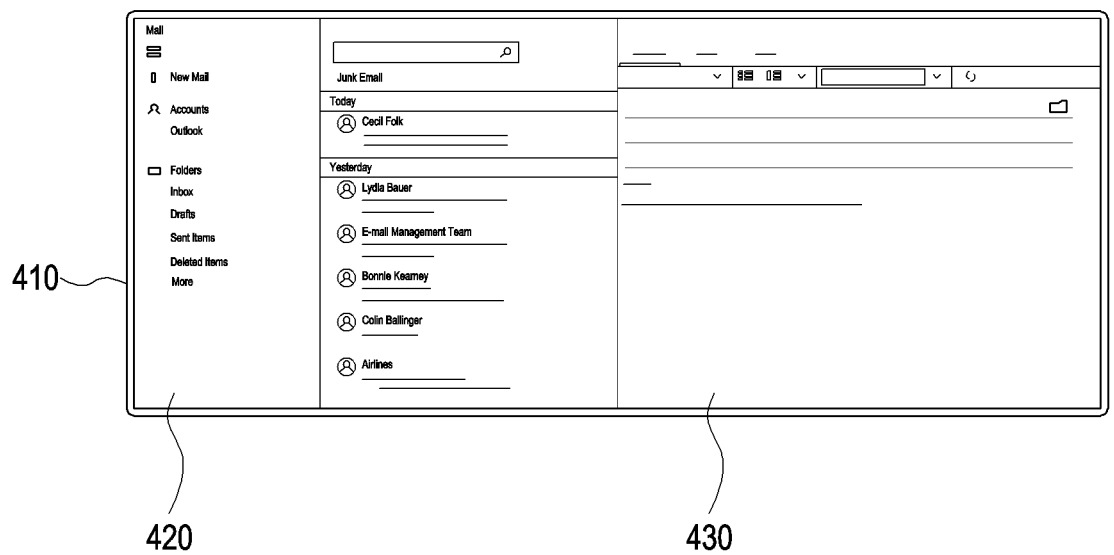
FIG. 13 is a front view illustrating a first state of an electronic device 101 including a flexible display 430 according to various embodiments of the disclosure.

FIG. 13 is a front view illustrating a first state of an electronic device 101 including a flexible display 430 according to various embodiments of the disclosure.

Referring to FIG. 13, according to an embodiment, the electronic device 101 may include a housing 410, a rigid display 420, and a flexible display 430. The housing 410, the rigid display 420, and the flexible display 430 of the electronic device 101 of FIG. 13 may be partially or entirely the same as the housing 410, the rigid display 420, and the flexible display 430 of the electronic device 101 of FIGS. 4 and 5.

According to various embodiments, the first state may mean the state in which all of the displays are fully unfolded. For example, the first state may be the state in which the entire areas of the rigid display 420 and the flexible display 430 are disposed to face the front direction.

According to an embodiment, a processor 120 (e.g., the processor 120 in FIG. 1) disposed inside the housing 410 may execute software (e.g., the program 140 in FIG. 1) so as to control at least one other component (e.g., a hardware or software component) of the electronic device 101 that is connected to the processor 120, and to perform various data processes or arithmetic operations.

According to an embodiment, in the first state, both the rigid display 420 and the flexible display 430 may operate. In the first state, a touch UI may be utilized in the entire areas of the rigid display 420 and the flexible display 430. For example, if a touch screen function is included in the flexible display 430, various operations, such as changing an icon displayed according to a user's touch input or changing an operation mode of the electronic device, may be possible.

According to an embodiment, in the first state, both the rigid display 420 and the flexible display 430 may perform different operations. For example, while a first operation is being performed and displayed on the rigid display 420, a second operation different from the first operation may be performed and displayed on the flexible display 430 may perform.

According to an embodiment, the processor 120 may detect the bent (or rolled) state of the flexible display 430 by recognizing a magnetic field provided by the flexible display 430, and may determine an active state of the rigid display 420 and the flexible display 430. For example, the processor 120 may detect the bent (or rolled) state of the flexible display 430 using information delivered from the plurality of magnets (e.g., the magnets 440 in FIG. 6) mounted inside the flexible display 430 and at least one sensor (e.g., the second sensor(s) 460 in FIG. 6) configured to detect a magnetic field. As another example, the processor 120 may detect the bent (or rolled) state of the flexible display 430 using information delivered from at least one sensor (e.g., the first sensor 450 in FIG. 6) mounted inside the rigid display 420 so as to detect a magnetic field. In the first state, when a signal is not input to the first sensor 450 and/or the second sensor(s) 460, the processor 120 may make a determination such that both the rigid display 420 and the flexible display 430 are switched to the active state.

According to an exemplary embodiment, a support member (e.g., a flat spring) may be inserted into an end of the flexible display 430 along an edge line thereof such that the flexible display 430 can maintain the flat state in the first state.

Figure 14A:
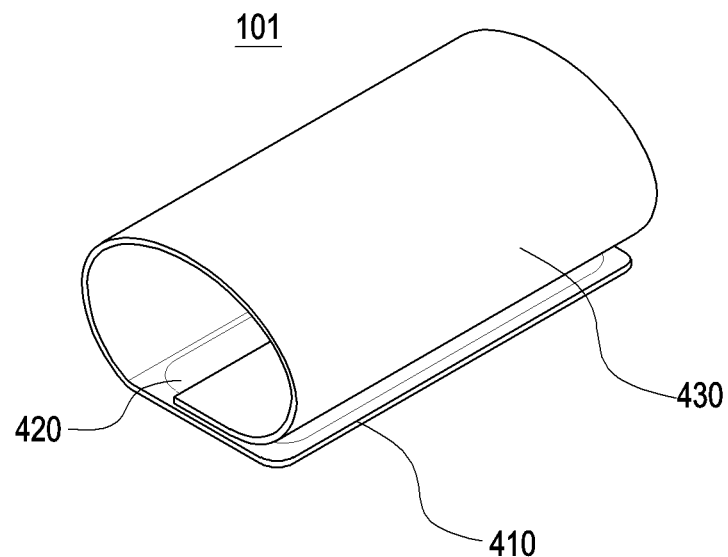
FIG. 14A is a perspective view illustrating a second state of an electronic device 101 including a flexible display 430 according to various embodiments of the disclosure.
Figure 14B:
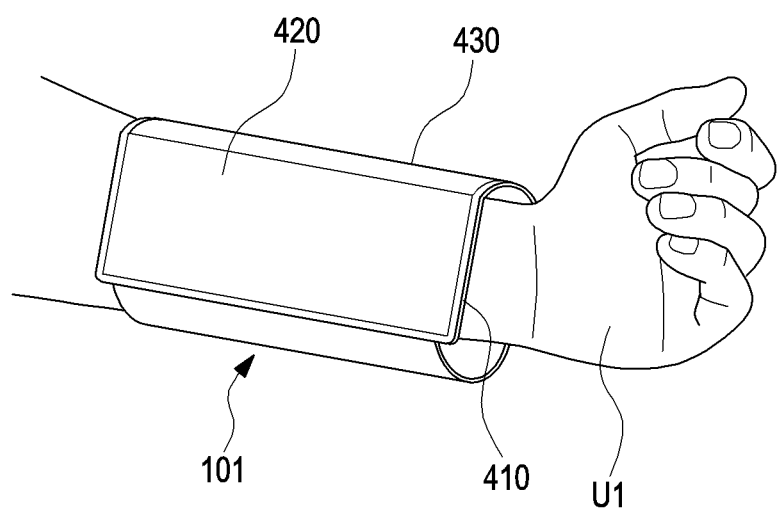
FIG. 14B is a perspective view illustrating the state in which the electronic device 101 in the second state of FIG. 14A is worn on a user's wrist.

FIG. 14A is a perspective view illustrating a second state of an electronic device 101 including a flexible display 430 according to various embodiments of the disclosure. FIG. 14B is a perspective view illustrating the state in which the electronic device 101 in the second state of FIG. 14A is worn on a user's wrist.

Referring to FIGS. 14A and 14B, according to an embodiment, the electronic device 101 may include a housing 410, a rigid display 420, and a flexible display 430. The housing 410, the rigid display 420, and the flexible display 430 of the electronic device 101 of FIGS. 14A and 14B may be partially or entirely the same as the housing 410, the rigid display 420, and the flexible display 430 of the electronic device 101 of FIGS. 4 and 5.

According to various embodiments, the second state may mean the state in which the flexible display 430 is bent (or rolled) with respect to the housing 410 on which the rigid display 420 is mounted. The flexible display 430 may be used as a wearable device since the flexible display forms a rolled state while maintaining a space R that enables the flexible display 430 to be worn around the wrist of the user U1.

According to an embodiment, a processor (e.g., the processor 120 in FIG. 1) disposed inside the housing 410 may execute software (e.g., the program 140 in FIG. 1) so as to control at least one other component (e.g., a hardware or software component) of the electronic device 101 that is connected to the processor 120, and to perform various data processes or arithmetic operations.

According to an embodiment, in the second state, only the rigid display 420 may operate, and the flexible display 430 may not operate. As another example, in the second state, the entire screen area of the rigid display 420 may operate, and only a partial screen area of the flexible display 430 may operate.

According to an embodiment, in the second state, both the rigid display 420 and the flexible display 430 may perform different operations. For example, while a first operation is being performed and displayed on the rigid display 420, a third operation different from the first operation may be performed and displayed on the flexible display 430. The third operation performed on the flexible display 430 may be performed in a side area adjacent to the rigid display 420, which may be an area exposed to the user's field of view. The third operation may be performed by outputting various kinds of information, such as weather information, time, phone reception, text message reception, through a partial area of the flexible display 430.

According to an embodiment, the processor 120 may detect the bent (or rolled) state of the flexible display 430 by recognizing a magnetic field provided by the flexible display 430, and may determine the active state of the rigid display 420 and the flexible display 430. For example, the processor 120 may detect the bent (or rolled) state of the flexible display 430 using information delivered from the plurality of magnets (e.g., the magnets 440 in FIG. 6) mounted inside the flexible display 430 and at least one sensor (e.g., the second sensor(s) 460 in FIG. 6) configured to detect a magnetic field. As another example, the processor 120 may detect the bent (or rolled) state of the flexible display 430 using information delivered from at least one sensor (e.g., the first sensor 450 in FIG. 6) mounted inside the rigid display 420 so as to detect a magnetic field. In the second state, when only a signal is input to the second sensor(s) 460, the processor 120 may make a determination such that only the rigid display 420 is switched to the active state and the flexible display 430 is switched to the inactive state.

According to an embodiment, the support member 470, which is disposed at the end area of the flexible display 430 in the second state, may include a metal material, and may induce magnetic coupling with a magnet (not illustrated) disposed at the end of the rigid display 420 so as to safely support the state in which the flexible display 430 is worn around the user's wrist.

Figure 15:
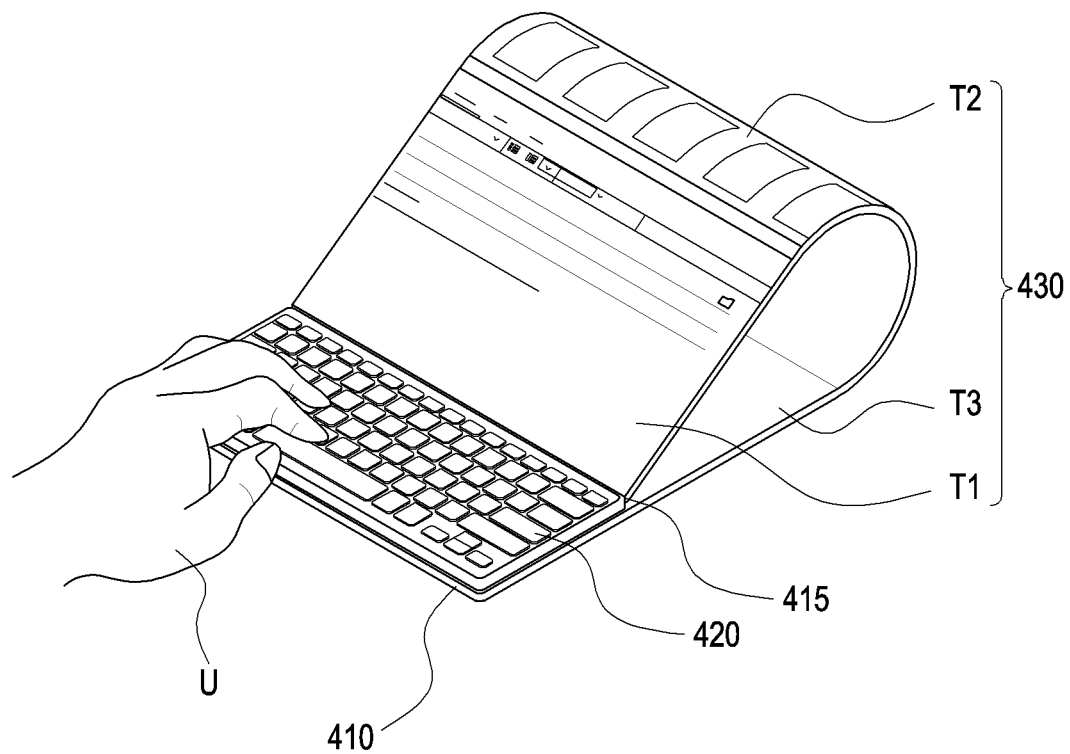
FIG. 15 is a perspective view illustrating a third state of an electronic device 101 including a flexible display 430 according to various embodiments of the disclosure.

FIG. 15 is a perspective view illustrating a third state of an electronic device 101 including a flexible display 430 according to various embodiments of the disclosure.

Referring to FIG. 15, according to an embodiment, the electronic device 101 may include a housing 410, a rigid display 420, and a flexible display 430. The housing 410, the rigid display 420, and the flexible display 430 of the electronic device 101 of FIG. 15 may be partially or entirely the same as the housing 410, the rigid display 420, and the flexible display 430 of the electronic device 101 of FIGS. 4 and 5.

According to various embodiments, the third state may mean a stand-up state in which some areas of the rigid display 420 and the flexible display 430 are organically used. For example, in the third state, the flexible display 430, which extends from the first end 415 of the housing 410 on which the rigid display 420 is mounted, is bent (or rolled) with a predetermined curvature so that the flexible display 430 can be connected to the first end 415 again. The flexible display 430 may maintain the state in which a partial area thereof is rolled such that the flexible display 430 can be fixed while maintaining an angle that allows the user to appropriately view the flexible display 430.

According to an embodiment, a processor (e.g., the processor 120 in FIG. 1) disposed inside the housing 410 may execute software (e.g., the program 140) so as to control at least one other component (e.g., a hardware or software component) of the electronic device 101 that is connected to the processor 120, and to perform various data processes or arithmetic operations.

According to an embodiment, in the third state, the entire area of the rigid display 420 and only a partial area of the flexible display 430 may operate. In the third state, both the rigid display 420 and the flexible display 430 may perform different operations. For example, while a first operation is being performed and displayed on the rigid display 420, a fourth operation different from the first operation may be performed and displayed on the flexible display 430. In the first operation, the entire screen area of the rigid display 420 may be used as a typable keypad. The third operation performed on the flexible display 430 may be performed in a side area adjacent to the rigid display 420, which may be an area exposed to the field of view of the user U. Information input through the first operation may be used as output information through the third operation, and may be used for a mode for typing, for example, e-mail and/or text message.

According to an embodiment, in the third state, the flexible display 430 is divided into a first area T1, a second area T2, and a third area T3 so as to provide different operations and/or different shapes. The first area T1 of the flexible display 430 may be provided as an output screen according to a signal of the rigid display 420 and may maintain a flat state. As another example, the second area T2 extending from the first area T1 of the flexible display 430 may be bent (or rolled) to support the first area T1 so as to form a predetermined angle. A partial area of the second area T2 may be provided as an output area similar to the first area T1. As another example, a third area T3 extending from the second area T2 of the flexible display 430 may extend from the rigid display 420 on the same plane as the rigid display 420 so as to support the electronic device 101 and may maintain the inactive state.

According to an embodiment, the processor 120 may detect the bent (or rolled) state of the flexible display 430 by recognizing a magnetic field provided by the flexible display 430, and may determine the active state of the rigid display 420 and the flexible display 430. For example, the processor 120 may detect the bent (or rolled) state of the flexible display 430 using information delivered from the plurality of magnets (e.g., the magnets 440 in FIG. 6) mounted inside the flexible display 430 and at least one sensor (e.g., the second sensor(s) 460 in FIG. 6) configured to detect a magnetic field. As another example, the processor 120 may detect the bent (or rolled) state of the flexible display 430 using information delivered from at least one sensor (e.g., the first sensor(s) 450 in FIG. 6) mounted inside the rigid display 420 so as to detect a magnetic field. In the third state, when a signal is input to the first sensor 450 and the second sensor(s) 460, the processor 120 may make a determination such that the rigid display 420 is switched to the active state, only a partial area of the flexible display 430 is switched to the active state, and the remaining area is switched to the inactive state.

According to an embodiment, the support member 470, which is disposed at the end area of the flexible display 430 in the third state, may include a metal material, and may induce magnetic coupling with a magnet (not illustrated) disposed at the end of the rigid display 420 to support the partial area of the flexible display 430, which provides the above-described screen function, so as to provide a predetermined angle.

Figure 16A:
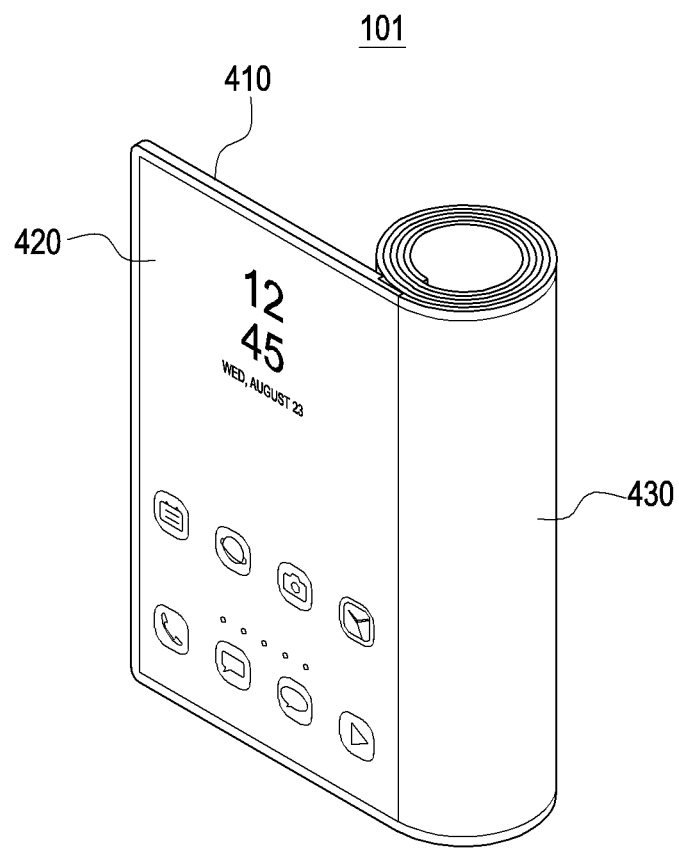
FIG. 16A is a perspective view illustrating a fourth state of an electronic device 101 including a flexible display 430 according to various embodiments of the disclosure.
Figure 16B:
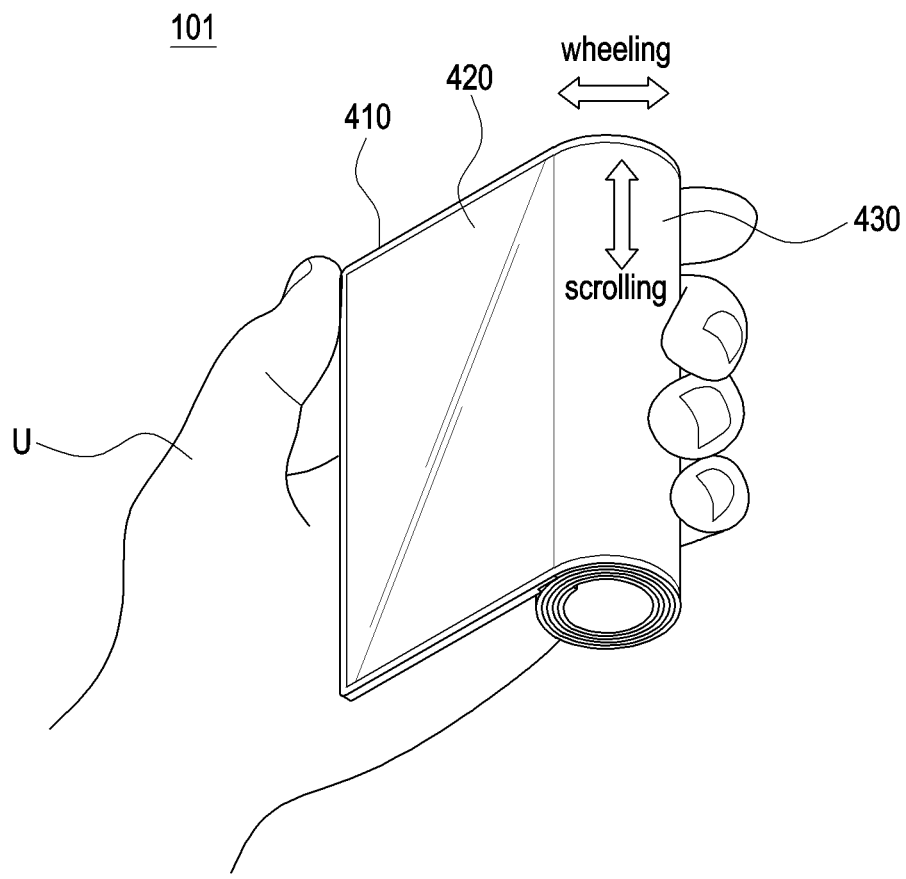
FIGS. 16B and 16C are perspective views each illustrating the state in which a user operates the flexible display 430 of the electronic device 101 in the fourth state of FIG. 16A while carrying the electronic device 101.
Figure 16C:
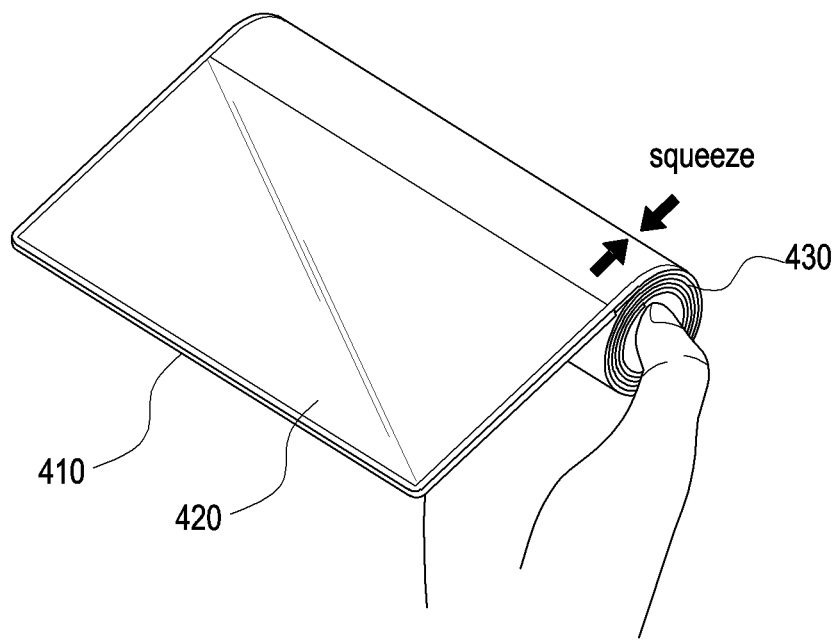

FIG. 16A is a perspective view illustrating a fourth state of an electronic device 101 including a flexible display 430 according to various embodiments of the disclosure. FIGS. 16B and 16C are perspective views each illustrating the state in which a user operates a portion of the flexible display 430 of the electronic device 101 in the fourth state of FIG. 16A while carrying the electronic device 101.

Referring to FIGS. 16A to 16C, according to an embodiment, the electronic device 101 may include a housing 410, a rigid display 420, and a flexible display 430. The housing 410, the rigid display 420, and the flexible display 430 of the electronic device 101 of FIGS. 16A to 16C may be partially or entirely the same as the housing 410, the rigid display 420, and the flexible display 430 of the electronic device 101 of FIGS. 4 and 5.

According to various embodiments, the fourth state may mean the state in which the flexible display 430 including a plurality of layers is bent (or rolled) (e.g., rolled) with respect to the housing 410 on which the rigid display 420 is mounted. The flexible display 430 may be provided in a rolled state of an appropriate thickness so that the flexible display 430 can be held with one hand of the user U so as to be carried.

According to an embodiment, a processor (e.g., the processor 120 in FIG. 1) disposed inside the housing 410 may execute software (e.g., the program 140) so as to control at least one other component (e.g., a hardware or software component) of the electronic device 101 that is connected to the processor 120, and to perform various data processes or arithmetic operations.

According to an embodiment, in the fourth state, only the rigid display 420 may operate, and the flexible display 430 may not operate. As another example, in the fourth state, the entire screen area of the rigid display 420 may operate, and only a partial screen area of the flexible display 430 may operate.

According to an embodiment, in the fourth state, both the rigid display 420 and the flexible display 430 may perform different operations. For example, while a first operation is being performed and displayed on the rigid display 420, a fifth operation different from the first operation may be performed and displayed on the flexible display 430. The fifth operation performed on the flexible display 430 may be performed in a side area adjacent to the rigid display 420, which may be an area exposed to the user's field of view. An edge display area for notification of the rigid display 420 may be used for the fifth operation of the flexible display 430. For example, the fifth operation may be a variety of interactions such as wheeling, scrolling, and squeezing, which assist the first operation (e.g., a screen output operation) and are performed for a one-hand mode.

According to an embodiment, the processor 120 may detect the bent (or rolled) state of the flexible display 430 by recognizing a magnetic field provided by the flexible display 430, and may determine the active state of the rigid display 420 and the flexible display 430. For example, the processor 120 may detect the bent (or rolled) state of the flexible display 430 using information delivered from the plurality of magnets (e.g., the magnets 440 in FIG. 6) mounted inside the flexible display 430 and at least one sensor (e.g., the second sensor(s) 460 in FIG. 6) configured to detect a magnetic field. As another example, the processor 120 may detect the bent (or rolled) state of the flexible display 430 using information delivered from at least one sensor (e.g., the first sensor(s) 450 in FIG. 6) mounted inside the rigid display 420 so as to detect a magnetic field. In the fourth state, when only a signal is input to the second sensor(s) 460, the processor 120 may make a determination such that only the rigid display 420 is switched to the active state and the flexible display 430 is switched to the inactive state.

According to an embodiment, the support member 470, which is disposed at the end area of the flexible display 430 in the fourth state, may include a metal material, and may induce magnetic coupling with a magnet (not illustrated) disposed at the end of the rigid display 420 so as to maintain the rolled state, which allows the user to hold the flexible display 430.

An electronic device (e.g., the electronic device 101 in FIGS. 1 to 6) according to various embodiments of the disclosure may include: a housing (e.g., the housing 410 in FIG. 6) including a front plate (e.g., the front plate 411 in FIG. 6) oriented in a first direction (e.g., the first direction (+Z) in FIG. 6), a rear plate (e.g., the rear plate 412 in FIG. 6) oriented in a second direction (e.g., the second direction (−Z) in FIG. 6) opposite to the first direction, and a side member (e.g., the side member 413 in FIG. 6) disposed to surround a space between the front plate and the rear plate; a rigid display (e.g., the rigid display 420 in FIG. 6) disposed between the front plate and the rear plate of the housing, the rigid display being configured to display information to an outside in the first direction; a flexible display (e.g., the flexible display 430 in FIG. 6) extending from one side of the rigid display, the flexible display being bent (or rolled) relative to the rigid display so as to define a curved surface or being disposed parallel to the rigid display so as to define a flat surface; a plurality of magnets (e.g., the magnets 440 in FIG. 6) arranged at a predetermined interval inside the flexible display; and a first sensor (e.g., the first sensor 450 in FIG. 6) disposed inside the rigid display, the first sensor being configured to detect a degree of bending (or rolling) of the flexible display by detecting magnetic force provided by the plurality of magnets.

According to various embodiments, the electronic device may further include a plurality of second sensors (e.g., the second sensors 460 in FIG. 6) arranged inside the flexible display at a predetermined interval, and configured to detect the degree of bending of the flexible display using magnetic force provided as positions of the plurality of magnets vary.

According to various embodiments, the electronic device may further include a processor (e.g., the processor 120 in FIG. 1) disposed inside the housing. The processor may be configured to receive signals for identifying the degree of bending (or rolling) of the flexible display from the first sensor and the second sensors, and to provide a predetermined control signal for determining the active state of the rigid display or the flexible display to the rigid display or the flexible display.

According to various embodiments, the electronic device may further include at least one support member (e.g., the support member 470 in FIG. 9) disposed at one end of the flexible display and configured to provide flatness to the flexible display.

According to various embodiments, the flexible display may be configured to have an area larger than that of the rigid display, and may have a first length (e.g., the first length 430*a* in FIG. 6) in the third direction (e.g., the third direction (+X or −X) in FIG. 6) and a second length (e.g., the second length 430*b* in FIG. 6) longer than the first length in a fourth direction (e.g., the fourth direction (+Y or −Y) in FIG. 6).

According to various embodiments, the flexible display may include a flexible display panel (e.g., the display panel 431 in FIG. 10), and a printed circuit board (e.g., the printed circuit board 432 in FIG. 10) stacked under the display panel. One surface of the support member may be disposed on the same plane as one surface of the flexible display panel.

According to various embodiments, the support member may include an elastic material, and the width of the support member disposed in the fourth direction is 1 to 10% of the second length of the flexible display.

According to various embodiments, since opposite end areas of the support member are bent to have a predetermined curvature toward the second direction in the state in which the flexible display is unfolded, the flexible display may maintain the flatness in the longitudinal direction.

According to various embodiments, the plurality of magnets may include first magnets (e.g., the first magnets 441 in FIG. 6) arranged along a first virtual line (e.g., the first virtual line L1 in FIG. 6) in the upper end area (e.g., the upper end S1 in FIG. 6) of the flexible display at a predetermined interval, and second magnets (e.g., the second magnets 442 in FIG. 6) arranged along a second virtual line (e.g., the second virtual line L2 in FIG. 6) in a lower end area (e.g., the lower end S2 in FIG. 6) of the flexible display at a predetermined interval. The first virtual line and the second virtual line may be parallel to each other.

According to various embodiments, an arrangement of the second magnets is disposed to correspond to an arrangement of the first magnets so as to be aligned on substantially the same axis as the arrangement of the first magnets.

According to various embodiments, the first sensor may be arranged along an edge of the rigid display adjacent to the flexible display, and may include a hall sensor.

According to various embodiments, a plurality of first sensors may be provided, and the plurality of first sensors may include a (1-1)th sensor (e.g., the (1-1)th sensor 451 in FIG. 6) disposed adjacent to at least some of the first magnets, and a (1-2)th sensor (e.g., the (1-2)th sensor 452 in FIG. 6) disposed adjacent to at least some of the second magnets. The (1-1)th sensor may be located on the first virtual line, and the (1-2)th sensor may be located on the second virtual line.

According to various embodiments, the plurality of second sensors may include (2-1)th sensors (e.g., the (2-1)th sensors 461 in FIG. 6) arranged along a third virtual line (e.g., the third virtual line L3 in FIG. 6) in the upper end area of the flexible display at a predetermined interval, and (2-2)th sensors (e.g., the (2-2)th sensors 462 in FIG. 6) arranged along a fourth virtual line (e.g., the fourth line L4 in FIG. 6) in the lower end area of the flexible display at a predetermined interval. The third virtual line and the fourth virtual line may be parallel to each other, the third virtual line may be spaced apart from the first virtual line, and the fourth virtual line may be spaced apart from the second virtual line.

According to various embodiments, the plurality of second sensors may be configured to detect the degree of bending of the flexible display in response to bending information detected by the first sensor. An arrangement of the (2-2)th sensors is disposed to correspond to an arrangement of the first magnets so as to be aligned on substantially the same axis as the arrangement of the (2-1)th sensors.

An electronic device according to various embodiments of the disclosure may include: a housing including a front plate, a rear plate facing away from the front plate, and a side member disposed to surround a space between the front plate and the rear plate; a rigid display disposed inside the housing and configured to display information to an outside; and a flexible display disposed outside the housing and extending from one side of the rigid display, the flexible display being bendable. The flexible display is configured to be variable to: a first state in which one surface of the flexible display is disposed to be oriented in the same direction as the rigid display; a second state in which the one surface of the flexible display is disposed to surround at least part of the front plate, the rear plate, and the side member; and a third state in which the flexible display is rolled and is disposed on one side of the housing.

According to various embodiments, the flexible display may be variable to a fourth state in which a plurality of areas are provided in different shapes. In the fourth state, the flexible display may include a first area (e.g., a first area T1 of FIG. 15) that can be provided as an output screen according to a signal of the rigid display, a second area (e.g., the second area T2 in FIG. 15) extending from the first area and bent to support the first area to form a predetermined angle with respect to the rigid display, and a third area (e.g., the third area T3 in FIG. 15) extending from the rigid display on the same plane as the rigid display so as to form a plane for supporting the electronic device.

According to various embodiments, the electronic device may further include a plurality of magnets arranged at predetermined intervals inside the flexible display, a first sensor disposed inside the rigid display and configured to detect magnetic force provided by the plurality of magnets and configured to detect a degree of bending of the flexible display, a plurality of second sensors arranged inside the flexible display at predetermined intervals and configured to detect a degree of bending of the flexible display through magnetic force provided as the positions of the plurality of magnets are varied, and a processor configured to receive signals from the first sensor and the second sensors so as to determine an activation state of the rigid display or the flexible display.

According to various embodiments, in the first state, when a signal for detecting whether or not the flexible display is bent is not input through the first sensor and the second sensors, the processor may determine that both the rigid display and the flexible display are in the active state, and may provide the determined signal to the rigid display and the flexible display.

According to various embodiments, in the second state, when a signal for detecting whether or not the flexible display is bent only through the second sensors is input through the first sensor and the second sensors, the processor may determine that the rigid display is in the active state and the flexible display is in the inactive state, and may provide the determined signal to the rigid display and the flexible display.

According to various embodiments, in the fourth state, when a signal for detecting whether or not the flexible display is bent is input through the first sensor and the second sensors, the processor may determine that at least a partial area of the rigid display and the flexible display is in the active state, and may provide the determined signal to the rigid display and the flexible display.

It may be apparent to a person ordinarily skilled in the technical field to which the disclosure belongs that the above-mentioned electronic device according to various embodiments is not limited by the above-mentioned embodiment and drawings, and may be variously substituted, modified, and changed within the technical scope of the disclosure.

The invention claimed is:

1. An electronic device comprising:
a housing comprising a front plate oriented in a first direction, a rear plate oriented in a second direction opposite to the first direction, and a side member disposed to surround a space between the front plate and the rear plate;
a rigid display disposed between the front plate and the rear plate of the housing, the rigid display being configured to display information to an outside in the first direction;
a flexible display extending from one side of the rigid display, the flexible display being bent relative to the rigid display so as to define a curved surface or being disposed parallel to the rigid display so as to define a flat surface;
a plurality of magnets arranged at a predetermined interval inside the flexible display;
a first sensor disposed inside the rigid display, the first sensor being configured to detect a state of bending of the flexible display by detecting magnetic force provided by the plurality of magnets, and
a plurality of second sensors arranged inside the flexible display at a predetermined interval, and configured to detect the degree of bending of the flexible display using magnetic force provided as positions of the plurality of magnets vary,
wherein the plurality of magnets include first magnets and second magnets,
wherein the first magnets are arranged along a first virtual line in an upper end area of the flexible display at a predetermined interval,
wherein the second magnets are arranged along a second virtual line in a lower end area of the flexible display at a predetermined interval,
wherein the first virtual line and the second virtual line are parallel to each other,
wherein the predetermined interval of the first magnets and the predetermined interval of the second magnets are formed to sequentially increase from one end of the flexible display connected to the rigid display to another end of the flexible display,
wherein the plurality of second sensors are disposed on a rear surface of the flexible display when the flexible display is fully unfolded state,
wherein the plurality of second sensors are arranged along a third virtual line when the flexible display is fully unfolded, and
wherein the third virtual line are parallel to the first virtual line and the second virtual line.

2. The electronic device of claim 1, further comprising:
a processor disposed inside the housing,
wherein the processor is configured to receive signals for identifying the degree of bending of the flexible display from the first sensor and the second sensors, and to determine an active state of at least one of the rigid display and the flexible display.

3. The electronic device of claim 2, further comprising:
at least one support member disposed at one end of the flexible display and configured to provide flatness to the flexible display.

4. The electronic device of claim 3, wherein the flexible display is configured to have an area larger than that of the rigid display, and has a first length in a third direction and a second length longer than the first length in a fourth direction perpendicular to the third direction.

5. The electronic device of claim 4, wherein the flexible display comprises:
a flexible display panel; and
a printed circuit board stacked under the display panel,
wherein one surface of the support member is disposed on a same plane as one surface of the flexible display panel.

6. The electronic device of claim 4, wherein the support member comprises an elastic material, and
a width of the support member disposed in the fourth direction is 1 to 10% of the second length of the flexible display.

7. The electronic device of claim 6, wherein since opposite end areas of the support member may be bent to have a predetermined curvature toward the second direction in the state in which the flexible display is unfolded, the flexible display maintains the flatness in the longitudinal direction.

8. The electronic device of claim 1, wherein an arrangement of the second magnets is disposed to correspond to an arrangement of the first magnets so as to be aligned on a substantially same axis as the arrangement of the first magnets.

9. The electronic device of claim 1, wherein the first sensor is arranged along an edge of the rigid display adjacent to the flexible display, and comprises a hall sensor.

10. The electronic device of claim 9, wherein a plurality of first sensors are provided,
wherein the plurality of first sensors comprise:
a (1-1)th sensor disposed adjacent to at least some of the first magnets; and a (1-2)th sensor disposed adjacent to at least some of the second magnets, and wherein the (1-1)th sensor is located on the first virtual line, and the (1-2)th sensor is located on the second virtual line.

11. The electronic device of claim 1, wherein the plurality of second sensors comprise:
- (2-1)th sensors arranged along the third virtual line in the upper end area of the flexible display at a predetermined interval; and
- (2-2)th sensors arranged along a fourth virtual line in the lower end area of the flexible display at a predetermined interval, and wherein the third virtual line and the fourth virtual line are parallel to each other, the third virtual line is spaced apart from the first virtual line, and the fourth virtual line is spaced apart from the second virtual line.

12. The electronic device of claim 11, wherein the plurality of second sensors are configured to detect the degree of bending of the flexible display in response to bending information detected by the first sensor, and an arrangement of the (2-2)th sensors is disposed to correspond to an arrangement of the first magnets so as to be aligned on a substantially same axis as the arrangement of the (2-1)th sensors.

13. The electronic device of claim 1, wherein the flexible display is variable to:
- a first state in which one surface of the flexible display is disposed to be oriented in a same direction as the rigid display;
- a second state in which the one surface of the flexible display is disposed to surround at least part of the front plate, the rear plate, and the side member; and
- a third state in which the flexible display is rolled and is disposed on one side of the housing.

* * * * *